United States Patent
Muto et al.

(10) Patent No.: US 8,786,644 B2
(45) Date of Patent: Jul. 22, 2014

(54) CONTROL DEVICE, DISPLAY APPARATUS, AND ELECTRONIC APPARATUS

(75) Inventors: Kota Muto, Suwa (JP); Yusuke Yamada, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 197 days.

(21) Appl. No.: 13/422,308

(22) Filed: Mar. 16, 2012

(65) Prior Publication Data

US 2012/0242715 A1 Sep. 27, 2012

(30) Foreign Application Priority Data

Mar. 22, 2011 (JP) ................................. 2011-062597

(51) Int. Cl.
*G09G 5/10* (2006.01)
*G09G 3/34* (2006.01)

(52) U.S. Cl.
USPC ............................. 345/690; 345/107; 345/214

(58) Field of Classification Search
CPC ............................. G09G 3/2051; G09G 3/344
USPC .................... 345/107, 207, 214, 690
See application file for complete search history.

(56) References Cited

U.S. PATENT DOCUMENTS

| | | | | |
|---|---|---|---|---|
| 7,804,483 B2* | 9/2010 | Zhou et al. | ..................... | 345/107 |
| 2006/0197738 A1* | 9/2006 | Kawai | ............................. | 345/107 |
| 2007/0146306 A1* | 6/2007 | Johnson et al. | ................ | 345/107 |
| 2010/0194789 A1* | 8/2010 | Lin et al. | ........................ | 345/690 |
| 2010/0245341 A1* | 9/2010 | Tanaka | ............................ | 345/214 |
| 2011/0001748 A1* | 1/2011 | Rutman et al. | ................. | 345/214 |
| 2011/0032227 A1* | 2/2011 | Miyaguchi | ..................... | 345/207 |

FOREIGN PATENT DOCUMENTS

| | | | |
|---|---|---|---|
| JP | 2003-324606 A | 11/2003 | |
| JP | 2006-243478 A | 9/2006 | |

* cited by examiner

*Primary Examiner* — Andrew Sasinowski

(74) *Attorney, Agent, or Firm* — ALG Intellectual Property, LLC

(57) ABSTRACT

A control device includes output means for outputting a signal for controlling an electro-optical device having a plurality of pixels which are provided so as to correspond to intersections of a plurality of scanning lines and a plurality of data lines, to the electro-optical device, and control means for controlling the output means to output a signal for applying a voltage corresponding to data stored in a memory to the plurality of data lines, whereby an image which is written by the signal when a first condition is satisfied has a higher spatial frequency of grayscale variations in an extending direction of the data lines than that of an image which is written by the signal when a second condition is satisfied.

16 Claims, 18 Drawing Sheets

| 0 | 5 | 10 | 15 |
|---|---|----|----|
| 0 | 5 | 10 | 15 |
| 0 | 5 | 10 | 15 |
| 0 | 5 | 10 | 15 |
FIG. 8A
| 1 | 8 | 3 | 10 |
|----|---|----|---|
| 12 | 5 | 14 | 7 |
| 4 | 11 | 2 | 9 |
| 15 | 8 | 13 | 6 |
FIG. 8B
| 1 | 13 | 13 | 25 |
|----|----|----|----|
| 12 | 10 | 24 | 22 |
| 4 | 16 | 12 | 24 |
| 15 | 13 | 23 | 21 |
FIG. 8C
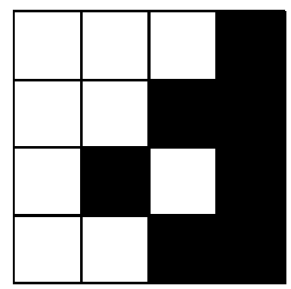
FIG. 8D
| 1 | 8 | 3 | 10 |
|----|---|----|---|
| 12 | 5 | 14 | 7 |
| 4 | 11 | 2 | 9 |
| 15 | 8 | 13 | 6 |
FIG. 9A
| 1 | 8 | 2 | 9 |
|---|----|---|----|
| 3 | 10 | 4 | 11 |
| 5 | 12 | 6 | 13 |
| 7 | 14 | 8 | 15 |
FIG. 9B
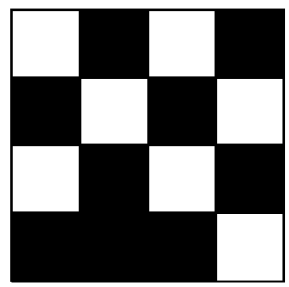
FIG. 9C
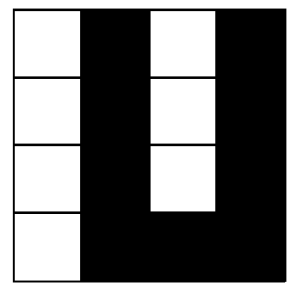
FIG. 9D

CONTROL DEVICE, DISPLAY APPARATUS, AND ELECTRONIC APPARATUS

BACKGROUND

1. Technical Field

The present invention relates to driving of an electro-optical device.

2. Related Art

There are known display apparatuses using an electro-optical element. For example, JP-A-2006-243478 (Patent Document 1) discloses a technique in which multi-grayscale display is performed using an area grayscale in an electronic paper which uses electrophoretic elements.

According to the technique of Patent Document 1, there are cases where power consumption becomes high when display is performed using the area grayscale.

SUMMARY

An advantage of the present invention is to provide a technique where display is performed using the area grayscale at lower power consumption.

An aspect of the present invention provides a control device including an output unit configured to output a signal for controlling an electro-optical device having a plurality of pixels which are provided so as to correspond to intersections of a plurality of scanning lines and a plurality of data lines, to the electro-optical device; and a control unit configured to control the output unit to output a signal for applying a voltage corresponding to data stored in a memory to the plurality of data lines, whereby an image which is written by the signal when a first condition is satisfied has a higher spatial frequency of grayscale variations in an extending direction of the data lines than that of an image which is written by the signal when a second condition is satisfied.

According to the control device, it is possible to perform display using an area grayscale with power consumption lower than a case of not using the second condition.

In a preferred aspect, the control device may further include a color quantization process unit configured to perform a color quantization process for a grayscale value of each of the plurality of pixels, indicated by data stored in the memory, whereby an image obtained through the color quantization process when the first condition is satisfied has the spatial frequency higher than an image obtained through the color quantization process when the second condition is satisfied.

According to the control device, it is possible to display an image which is represented using the area grayscale through the color quantization process with power consumption lower than a case of not using the second condition.

In another preferred aspect, the control device may further include a first storage unit configured to store a first dither matrix and a second dither matrix which has a lower spatial frequency of grayscale variations in the extending direction of the data lines than that of the first dither matrix, and the color quantization process unit may perform the color quantization process using the first dither matrix when the first condition is satisfied and using the second dither matrix when the second condition is satisfied.

According to the control device, it is possible to display an image which is represented using the area grayscale through the color quantization process which uses the dither matrix with power consumption lower than a case of not using the second condition.

In still another preferred aspect, grayscales of the plurality of pixels may be changed by a writing operation where a voltage is applied to a corresponding pixel multiple times, wherein the control unit may determine a pixel of which a grayscale is to be changed of the plurality of pixels, using a comparison result between image data read from a second storage unit configured to store the image data indicating an image which is newly displayed on the electro-optical device, and scheduled image data read from a third storage unit configured to store the scheduled image data indicating an image which is scheduled to be displayed on the electro-optical device by the writing operation in progress, wherein the control unit may control the output unit to output the signal for starting the writing operation for a corresponding pixel so as to have a grayscale set by the image data if the pixel determined as a pixel of which a grayscale is to be changed is not in the writing operation, and controls the output unit to output the signal for starting the writing operation for a corresponding pixel so as to have a grayscale set by the image data after the writing operation in progress is finished if the pixel determined as the pixel of which a grayscale is to be changed is in the writing operation, and wherein the second condition may be a condition that there is a pixel where the writing operation is in progress.

According to the control device, it is possible to improve a perceived rewriting speed and to display an image which is represented using the area grayscale with power consumption lower than a case of not using the second condition.

In still another preferred aspect, the first condition may be a condition that there is no pixel where the writing operation is in progress.

According to the control device, it is possible to suppress power consumption in a case where a writing operation is in progress.

In still another preferred aspect, when the first condition is satisfied, the control unit may rewrite an image which has been written according to the second condition, according to the first condition.

According to the control device, it is possible to display a higher quality image after the writing operation is finished.

In still another preferred aspect, the second condition may be a condition that an updating frequency of the image is equal to or more than a threshold value.

According to the control device, it is possible to suppress power consumption in a case where an image updating frequency is high.

In still another preferred aspect, the first condition may be a condition that the updating frequency of the image is less than the threshold value.

According to the control device, it is possible to suppress power consumption in a case where the image updating frequency is high.

In still another preferred aspect, the first condition may be a condition that updating of the image is finished at a frequency which is equal to or more than the threshold value.

According to the control device, it is possible to suppress power consumption while an image is updated at a low updating frequency.

In still another preferred aspect, the second condition may be a condition that a remaining capacity of a battery which supplies power to the control device is less than a threshold value.

According to the control device, it is possible to reduce power consumption after the remaining capacity of the battery is small.

In still another preferred aspect, the first condition may be a condition that the remaining capacity of the battery is equal to or more than a threshold value.

According to the control device, it is possible to reduce power consumption after the remaining capacity of the battery is small as compared with a case where the remaining capacity of the battery is large.

In still another preferred aspect, the second condition may be a condition that the image is a character image.

According to the control device, it is possible to perform a low power consumption operation when a character image is written.

In still another preferred aspect, the first condition may be a condition that the image is a picture image.

According to the control device, it is possible to perform a low power consumption operation when a character image is written as compared with when a picture image is written.

Another aspect of the present invention provides a display apparatus including any one of the control devices and the electro-optical device.

According to the display apparatus, it is possible to perform display using the area grayscale with power consumption lower than a case of not using the second condition.

Yet another aspect of the present invention provides an electronic apparatus including the display apparatus.

According to the electronic apparatus, it is possible to perform display using the area grayscale with power consumption lower than a case of not using the second condition.

Still yet another aspect of the present invention provides a driving method of an electro-optical device having a plurality of pixels which are provided so as to correspond to intersections of a plurality of scanning lines and a plurality of data lines, including a step of controlling the output unit to output a signal for applying a voltage corresponding to data stored in a memory to the plurality of data lines, whereby an image which is written by the signal when a first condition is satisfied has a higher spatial frequency of grayscale variations in an extending direction of the data lines than that of an image which is written by the signal when a second condition is satisfied.

According to the driving method, it is possible to perform display using the area grayscale with power consumption lower than a case of not using the second condition.

BRIEF DESCRIPTION OF THE DRAWINGS

FIGS. 8A to 8D show diagrams illustrating a pattern dither method.

FIGS. 9A to 9D show diagrams exemplifying a low power consumption type dither matrix.

DESCRIPTION OF EXEMPLARY EMBODIMENTS

1. Configuration

Figure 1:
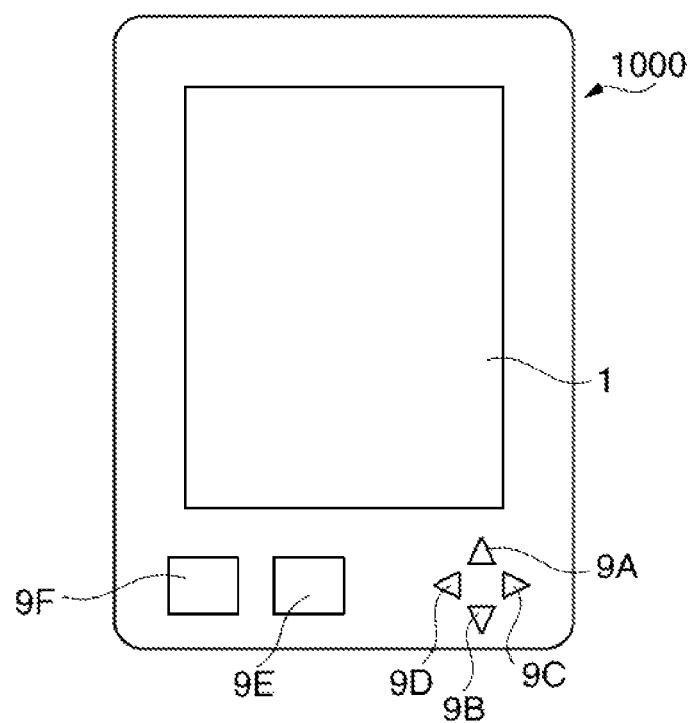
FIG. 1 shows a diagram illustrating an exterior of an electronic apparatus according to an embodiment.

FIG. 1 is a diagram illustrating an exterior of an electronic apparatus 1000 according to an embodiment. The electronic apparatus 1000 includes a display apparatus which displays images. As an example, the electronic apparatus 1000 is an apparatus for reading electronic books (an example of documents), a so-called electronic book reader. The electronic book is data including images of a plurality of pages. The electronic apparatus 1000 displays the electronic book on a display unit 1 with predetermined units (for example, one page). Of the plurality of pages included in the electronic book, a page which is displayed is referred to as a "selected page". The selected page is changed depending on the operation of buttons 9A to 9F by a user. That is to say, the user can turn over the pages (advance pages or return pages) of the electronic book by operating the buttons 9A to 9F.

Figure 2:
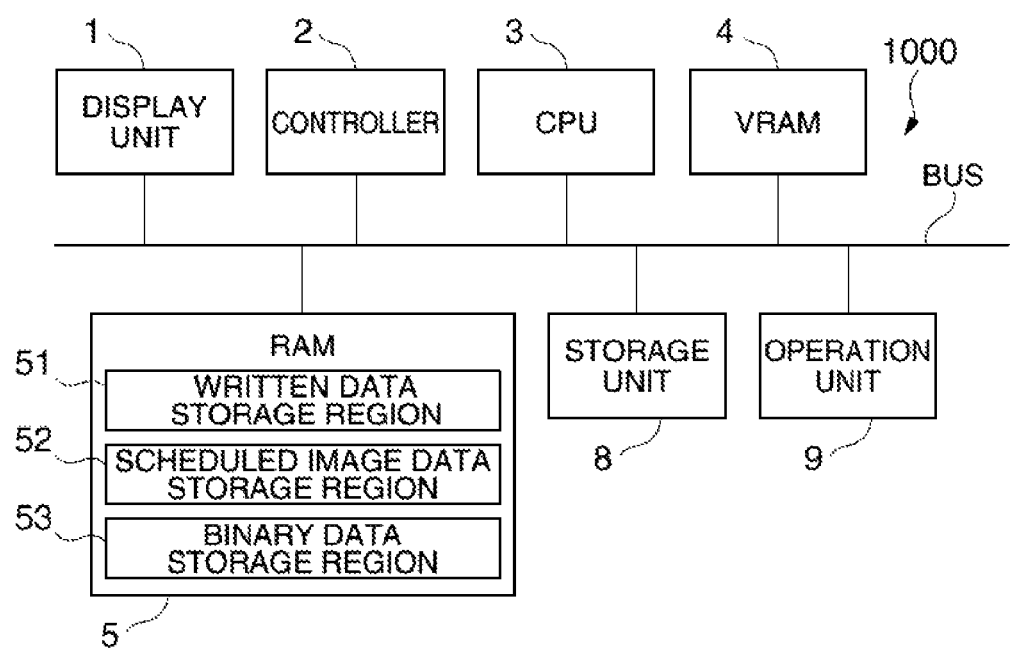
FIG. 2 shows a block diagram illustrating a hardware configuration of the electronic apparatus.

FIG. 2 is a block diagram illustrating a hardware configuration of the electronic apparatus 1000. The electronic apparatus 1000 includes the display unit 1, a controller 2, a control unit 3, a VRAM (Video Random Access Memory) 4, a RAM (Random Access Memory) 5, a storage unit 8, an operation unit 9, and a bus BUS. The display unit 1 has a display panel including a display element which displays images. In this example, the display element is a memory type display element which maintains display without giving energy through an application of a voltage and uses electrophoretic particles. The display unit 1 displays monochrome multiple grayscales (in this example, two grayscales of black and white) using the display element. The controller 2 controls the display unit 1. The control unit 3 is a device which controls respective units of the electronic apparatus 1000, for example, a microcomputer having a CPU (Central Processing Unit), a ROM (Read Only Memory), and a RAM. The CPU uses the RAM as a work area, and executes programs stored in the ROM or the storage unit 8. The VRAM 4 is a memory which stores image data indicating images displayed on the display unit 1. The RAM 5 is a memory which stores data, and, in this example, particularly, includes a written data storage region 51 which stores written data, a scheduled image data storage region 52 which stores scheduled image data, and a binary data storage region 53 which stores binarized image data. Details of the written data and the scheduled image data will be described later. The storage unit 8 is a nonvolatile memory which stores electronic book data (book data). The storage unit 8 can store data of a plurality of electronic books. The operation unit 9 is an input device for inputting user's instructions, and includes, for example, a touch screen, a keypad, or buttons. The buttons 9A to 9F shown in FIG. 1 is one of detailed examples of the operation unit 9. The bus BUS is a transmission path which transmits data or signals between constituent elements.

Figure 3:
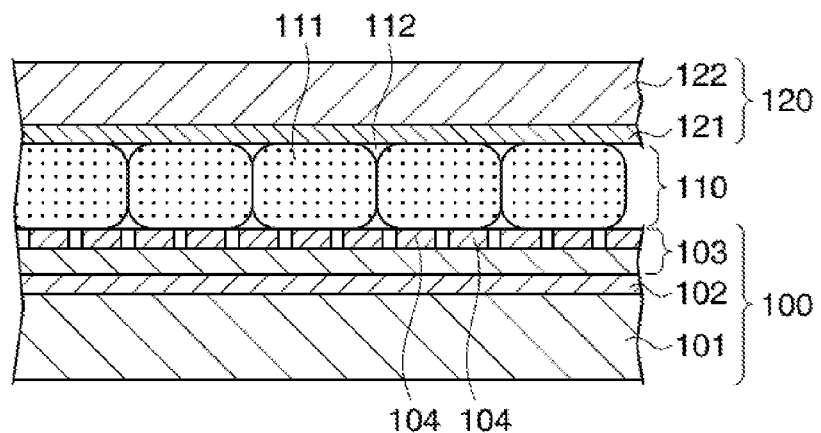
FIG. 3 shows a schematic diagram illustrating a cross-sectional structure of a display unit.

FIG. 3 is a schematic diagram illustrating a cross-sectional structure of the display unit 1. The display unit 1 includes a first substrate 100, an electrophoretic layer 110, and a second substrate 120. The first substrate 100 and the second substrate 120 are substrates for interposing the electrophoretic layer 110 therebetween.

The first substrate 100 includes a substrate 101, an adhesive layer 102, and a circuit layer 103. The substrate 101 is made of an insulative and flexible material, for example, polycarbonate. The substrate 101 may be made of a resin material other than the polycarbonate as long as it is light, flexible, elastic, and insulative. As another example, the substrate 101 may be made of glass which is not flexible. The adhesive layer 102 is a layer used to adhere the substrate 101 and the circuit layer 103 to each other. The circuit layer 103 is a layer which has circuits driving the electrophoretic layer 110. The circuit layer 103 includes pixel electrodes 104.

The electrophoretic layer 110 has a binder 112 and micro capsules 111. The micro capsules 111 are fixed by the binder 112. The binder 112 uses materials which have excellent adhesiveness with electrodes because of good affinity with the micro capsules 111 and further are insulative. The micro capsules 111 are capsules which store a disperse medium and electrophoretic particles therein. The micro capsules 111 use a flexible material, for example, a gum arabic gelatin-based compound, a urethane-based compound, or the like. In addition, an adhesive layer formed of adhesive may be provided between the micro capsules 111 and the pixel electrodes 104.

The disperse medium is water, an alcohol-based solution (methanol, ethanol, isopropanol, butanol, octanol, methyl cellosolve, or the like), an ester (ethyl acetate, butyl acetate, or the like), a ketone (acetone, methyl ethyl ketone, methyl isobutyl ketone, or the like), an aliphatic hydrocarbon (pentane, hexane, decane, octane, or the like), an alicyclic hydrocarbon (cyclohexane, methylcyclohexane, or the like), an aromatic hydrocarbon (benzene, toluene, benzene having a long chain alkyl group (xylene, hexylbenzene, heptylbenzene, octylbenzene, nonylbenzene, decylbenzene, undecylbenzene, dodecylbenzene, tridecylbenzene, tetradecylbenzene, or the like)), a halogenated hydrocarbon (methyl chloride, chloroform, carbon tetrachloride, 1,2-dichloroethane, or the like), or a carboxylate. As another example, the disperse medium may be other oils. In addition, the disperse medium may be a mixture of the materials. As still another example, the disperse medium may be blended with a surfactant.

The electrophoretic particles are particles (polymer or colloid) which have a property of being moved depending on electric fields in the disperse medium. In the embodiment, white electrophoretic particles and black electrophoretic particles are stored in the micro capsules 111. The black electrophoretic particles are particles including black pigments such as, for example, aniline black or carbon black, and are charged to a positive polarity in the embodiment. The white electrophoretic particles are particles including white pigments such as, for example, titanium dioxide or aluminum oxide, and are charged to a negative polarity in the embodiment.

The second substrate 120 includes a film 121 and a transparent electrode 122. The film 121 seals and protects the electrophoretic layer 110. The film 121 is made of a transparent and insulative material, for example, polyethylene terephthalate. The transparent electrode 122 is made of a transparent and conductive material, for example, indium tin oxide (ITO).

Figure 4:
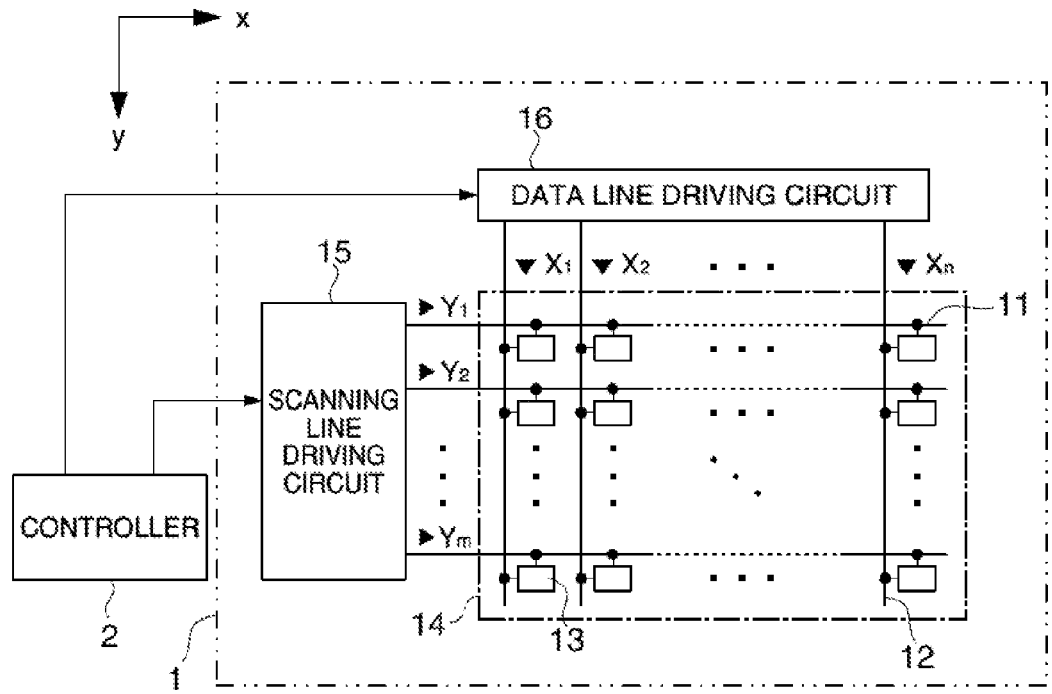
FIG. 4 shows a diagram illustrating a configuration of a circuit of the display unit.

FIG. 4 is a diagram illustrating a configuration of the circuit of the display unit 1. The display unit 1 includes m scanning lines 11, n data lines 12, m×n pixels 13, a scanning line driving circuit 15, and a data line driving circuit 16. The m×n pixels 13 form a display region 14. The scanning line driving circuit 15 and the data line driving circuit 16 are controlled by the controller 2. The scanning lines 11 are disposed in the row direction (x direction), and transmit a scanning signal. The scanning signal is a signal which sequentially and exclusively selects one scanning line 11 of the m scanning lines 11. The data lines 12 are disposed (extend) in the column direction (y direction), and transmit data signals. The data signals are signals corresponding to grayscales of the respective pixels. The scanning lines 11 and the data lines 12 are insulated from each other. The pixels 13 are provided so as to correspond to intersections of the scanning lines 11 and the data lines 12, and represent grayscales corresponding to the data signals. In addition, when it is necessary to differentiate one scanning line 11 from other scanning lines among a plurality of scanning lines 11, they are scanning lines 11 in the first row, the second row, . . . , and the m-th row. This is also true of the data lines 12.

Figure 5:
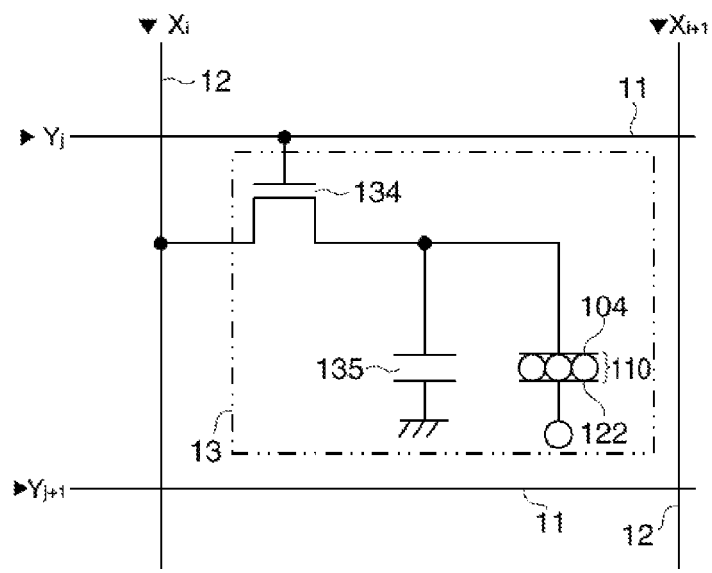
FIG. 5 shows a diagram illustrating an equivalent circuit of a pixel.

FIG. 5 is a diagram illustrating an equivalent circuit of the pixel 13. The pixel 13 includes a transistor 134, a storage capacitor 135, the pixel electrode 104, the electrophoretic layer 110, and the transparent electrode 122. The transistor 134 is a switching element which controls writing of data to the pixel electrode 104, and, for example, an n channel TFT (Thin Film Transistor). A gate, a source, and a drain of the transistor 134 are respectively connected to the scanning line 11, the data line 12, and the pixel electrode 104. When a scanning signal in an L (Low) level (non-selection signal) is input to the gate, the source and the drain of the transistor 134 are insulated from each other. When a scanning signal in an H (High) level (selection signal) is input to the gate, the source and the drain of the transistor 134 are electrically connected to each other, and a data voltage (a voltage indicated by a data signal) is written to the pixel electrode 104. In addition, the storage capacitor 135 is also connected to the drain of the transistor 134. The storage capacitor 135 maintains charge corresponding to the data voltage. The pixel electrode 104 is provided singly in the pixel 13, and is opposite to the transparent electrode 122. The transparent electrode 122 is common to all the pixels 13, and a potential Vcom is applied thereto. The electrophoretic layer 110 is interposed between the pixel electrode 104 and the transparent electrode 122. A voltage corresponding to a potential difference between the pixel electrode 104 and the transparent electrode 122 is applied to the electrophoretic layer 110. In the micro capsule 111, the electrophoretic particles are moved corresponding to a voltage applied to the electrophoretic layer 110, thereby representing grayscales. If a potential of the pixel electrode 104 is positive (for example, +15 V) with respect to the potential Vcom of the transparent electrode 122, the white electrophoretic particles charged to the negative polarity are moved to the pixel electrode 104 side, and the black electrophoretic particles charged to the positive polarity are moved to the transparent electrode 122 side. At this time, when the display unit 1 is viewed from the second substrate 120 side, the pixels are viewed as black. If a potential of the pixel electrode 104 is negative (for example, −15 V) with respect to the potential Vcom of the transparent electrode 122, the black electrophoretic particles charged to the positive polarity are moved to the pixel electrode 104 side, and the white electrophoretic particles charged to the negative polarity are moved to the transparent electrode 122 side. At this time, the pixels are viewed as white.

Further, in the following description, a period until selection of the scanning line in the m-th row is completed after the scanning line driving circuit 15 selects the scanning line in the first row, is referred to as a "frame period" or simply a "frame". Each scanning line 11 is selected once for one frame, and a data signal is provided to each pixel 13 once for one frame.

Figure 6:
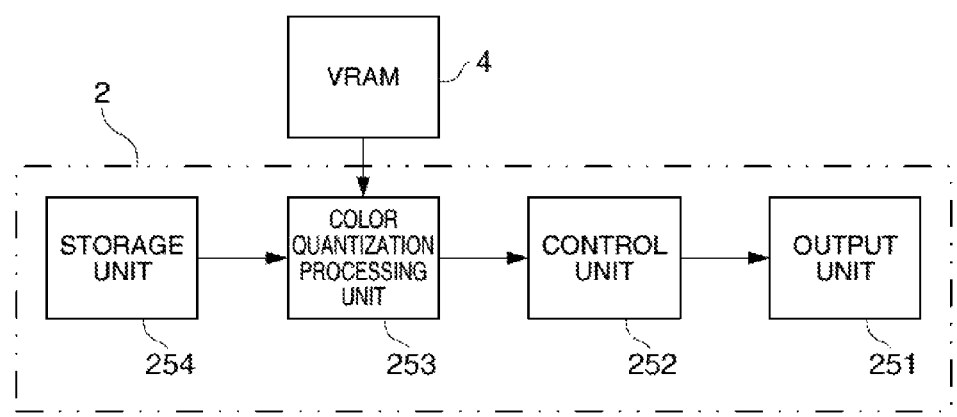
FIG. 6 shows a diagram illustrating a functional configuration of a controller.

FIG. 6 is a diagram illustrating a functional configuration of the controller 2. The controller 2 includes an output unit 251, a control unit 252, a color quantization processing unit 253, and a storage unit 254. The output unit 251 outputs a signal for controlling the display unit 1 (electro-optical device) to the display unit 1 (more specifically, the scanning line driving circuit 15 and the data line driving circuit 16). The control unit 252 controls the output unit 251 to output a signal for applying voltages corresponding to data stored in the VRAM 4 to the data lines 12. Here, an image which is written by the signal when a first condition is satisfied has a higher spatial frequency of grayscale variations in the extending direction of the data lines 12 than that of an image which is written by the signal when a second condition is satisfied. The color quantization processing unit 253 performs a color quantization process for a grayscale value of each of the pixels 13 of m rows and n columns, indicated by data stored in the VRAM 4. An image which is obtained through the color quantization process when the first condition is satisfied has a higher spatial frequency in the extending direction of the data lines 12 than that of an image which is obtained through the color quantization process when the second condition is satisfied. The storage unit 254 stores a Bayer type dither matrix (an example of a first dither matrix) and a longitudinal dither matrix (an example of a second dither matrix). The color quantization processing unit 253 performs the color quantization process using the first dither matrix when the first condition is satisfied, and using the second dither matrix when the second condition is satisfied. This function is realized using hardware. As another example, the controller 2 may have a processor, and execute programs, thereby realizing the function.

2. Operation

Figure 7:
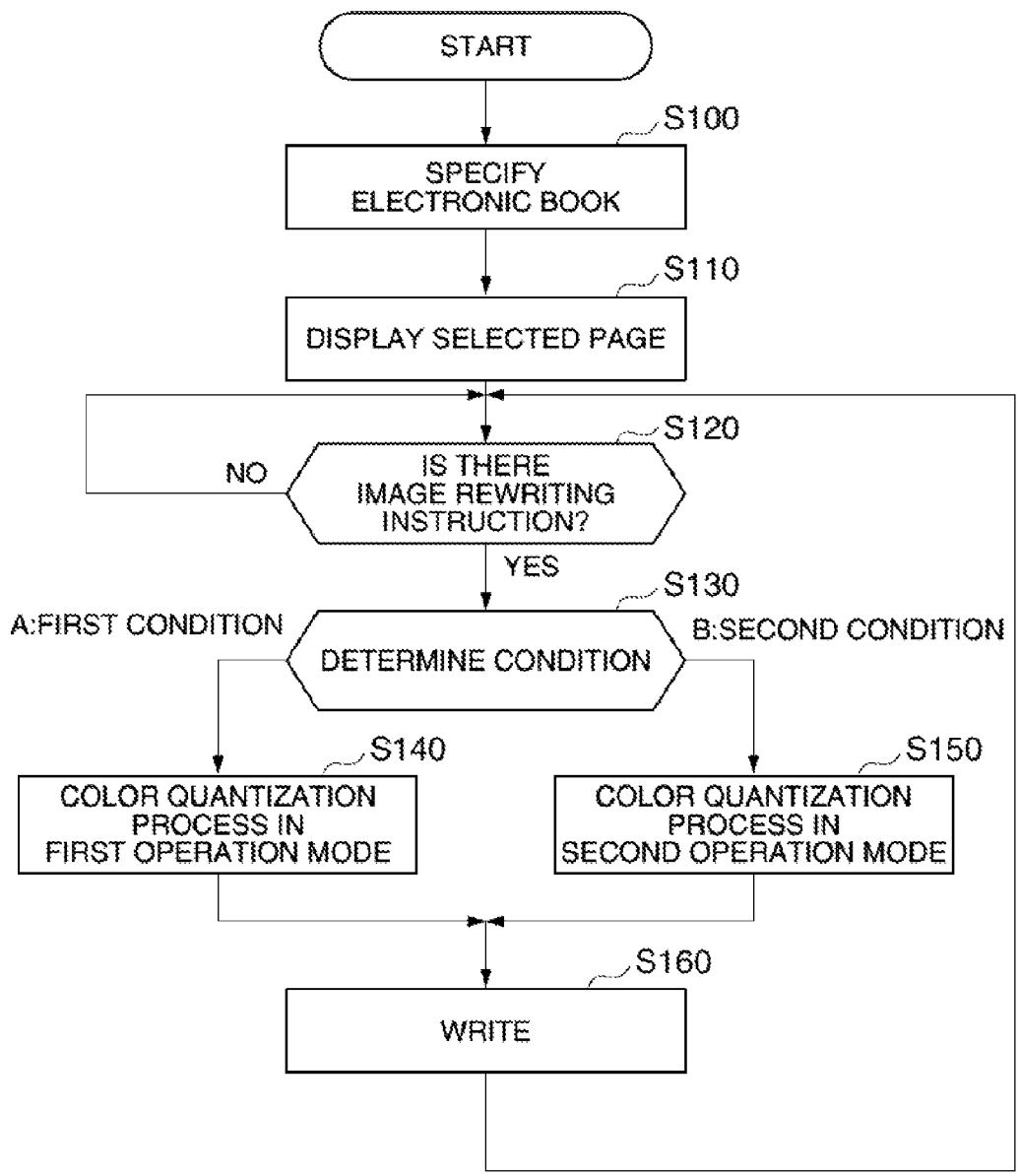
FIG. 7 shows a flowchart illustrating an operation of the electronic apparatus.

FIG. 7 is a flowchart showing an operation of the electronic apparatus 1000. The flow in FIG. 7 is started, for example, when a user inputs an instruction for displaying a certain electronic book to the electronic apparatus 1000. In step S100, the control unit 3 specifies an electronic book which is displayed. In addition, the control unit 3 selects one page as a selected page from a plurality of pages included in the electronic book. A displayed electronic book and selected page are specified in response to, for example, an instruction from a user.

In step S110, the control unit 3 obtains data of the selected page from book data of the target electronic book. The control unit 3 generates raster data indicating a grayscale value for each of the pixels 13 of m rows and n columns from the obtained data. The control unit 3 writes the generated raster data in the VRAM 4. When the data is written in the VRAM 4, the control unit 3 instructs the controller 2 to perform rewriting. When the instruction is given from the control unit 3, the controller 2 performs the rewriting. The rewriting operation will be described in detail later.

In step S120, the controller 2 determines whether or not there is an instruction for rewriting. A rewriting instruction is output from the control unit 3. The control unit 3 rewrites the VRAM 4 and then outputs the rewriting instruction in response to an instruction from the user, for example, if the user inputs an instruction for changing the selected page by pressing the page advance button 9. If there is the rewriting instruction (step S120: YES), the flow proceeds to step S130 where the controller 2 performs a process. If there is no rewriting instruction (step S120: NO), the controller 2 waits until the rewriting instruction is given.

In step S130, the controller 2 determines whether or not the rewriting instruction satisfies one of a plurality of conditions including the first condition and the second condition. In this example, the first condition uses high-speed page advance, and the second condition uses normal page advance. The "high-speed page advance" indicates that a rewriting instruction is input such that a time until a new rewriting instruction is input from a time point when a previous rewriting instruction is input is equal to or less than a threshold value. The "normal page advance" is not the high-speed page advance, that is, indicates that a rewriting instruction is input such that the time until the new rewriting instruction is input from the time point when the previous rewriting instruction is input is greater than the threshold value. In this case, the controller 2 stores the time point when there is a previous rewriting instruction in the RAM 5. If it is determined that the first condition is satisfied (step S130: A), the flow proceeds to step S140 where the controller 2 performs a process. If it is determined that the second condition is satisfied (step S130: B), the flow proceeds to step S150 where the controller 2 performs a process.

In this example, the controller 2 performs the color quantization process according to one operation mode among a plurality of operation modes including a first operation mode and a second operation mode. The "color quantization process" indicates a process where data of p grayscales is converted into data of q grayscales (p>q). In this example, the controller 2 performs a binarization process using a pattern dither method where data is binarized using a dither matrix (also referred to as a dither pattern or a dither table) as an example of the color quantization process.

FIGS. 8A to 8D are diagrams illustrating the pattern dither method. Here, a description will be made of an example where original data of sixteen grayscales of 0 to 15 is converted into data of two grayscales of 0 to 1. For simplicity, there is a use of an example where image data is formed by pixels of four rows and four columns and the dither matrix is a matrix of four rows and four columns. FIG. 8A is a diagram exemplifying original data. In this example, in the original data, grayscale values of the first column to the fourth column are respectively "0", "5", "10", and "15". FIG. 8B is a diagram exemplifying the dither matrix. FIG. 8B shows a so-called Bayer type dither matrix. In the dither matrix, numerical values corresponding to the grayscale values (sixteen numerical values of 0 to 15 which are hereinafter referred to as "dither values") are basically arranged according to a certain rule. In addition, in the example shown in FIG. 8B, the dither value "0" is not used, and fifteen numerical values of 1 to 15 are used. For this reason, the dither value "8" corresponding to an intermediate grayscale appears twice in the dither matrix.

The binarization process using the dither matrix is performed as follows. First, a grayscale value of the original data and a dither value of the dither matrix are added. The addition is performed for a corresponding pixel and cell. For example, a grayscale value of the pixel in the i-th row and j-th column of the original data is added to a dither value of the cell in the i-th row and the j-th column of the dither matrix. FIG. 8C shows a state where both of them are added. Next, the added values are binarized using a threshold value as a reference. The threshold value uses a numerical value corresponding to the number of grayscales, in this example, "16". That is to say, a grayscale value of the pixel where the added value is less than 16 is converted into "0", and a grayscale value of the pixel where the added value is equal to or more than 16 is converted into "1". FIG. 8D shows a state after the binarization. Further, the reason why the dither value "0" is not used in the dither matrix is that an added value is necessarily equal to or more than the threshold value with respect to pixels of the grayscale value "15". If the dither value "0" is added to a pixel of the grayscale value "15", the added value is "15" which is not equal to or more than the threshold value, and thus there is a possibility that a grayscale of the pixel having the maximum grayscale value may be converted into "0". In order to prevent such a problem, the dither value "0" is not used.

In FIGS. 8A to 8F, the description has been made using the example where the number of pixels of the original data is the same as the number of cells of the dither matrix. However, they may be different from each other. For example, in a case where an image formed by pixels of 800 rows and 480 columns is binarized using a dither matrix formed by cells of 16 rows and 16 columns, an original data image is divided into blocks of 16 rows and 16 columns, and the above-described process is performed for each block.

In the embodiment, the controller 2 stores a plurality of dither matrices including the first dither matrix and the second dither matrix in an internal memory. The controller 2 performs the binarization process using the first dither matrix in the first operation mode, and using the second dither matrix in the second operation mode. In this example, the first dither matrix uses the Bayer type dither matrix, and the second dither matrix uses the longitudinal dither matrix. The longitudinal dither matrix is an example of a low power consumption type dither matrix. Here, the "low power consumption type dither matrix" indicates a dither matrix having a lower spatial frequency of grayscale value variations in a direction (the column direction in the figure, that is, the longitudinal direction) corresponding to the extending direction of the data lines 12 than that of the first dither matrix.

FIGS. 9A to 9D are diagrams exemplifying the low power consumption type dither matrix. FIG. 9A shows the Bayer type dither matrix, and FIG. 9B shows the low power consumption type dither matrix. FIG. 9C shows an image where data of which grayscale value of all the pixels is "8" (intermediate grayscale value) is binarized using the dither matrix in FIG. 9A, and FIG. 9D shows an image where the same data is binarized using the dither matrix in FIG. 9B. As can be seen from comparison of FIG. 9C and FIG. 9D, the image which is binarized using the low power consumption type dither matrix has a lower spatial frequency of grayscale variations in the column direction. That is to say, the image which is binarized using the low power consumption type dither matrix has a higher ratio where the same grayscale value is continuous in the column direction.

FIG. 7 is referred to again. In step S140, the controller 2 performs the binarization process (color quantization process) in the first operation mode. The controller 2 writes the binarized image data to the binary data storage region 53 of the RAM 5. In step S160, the controller 2 performs a writing operation for the pixels 13.

Figure 10:
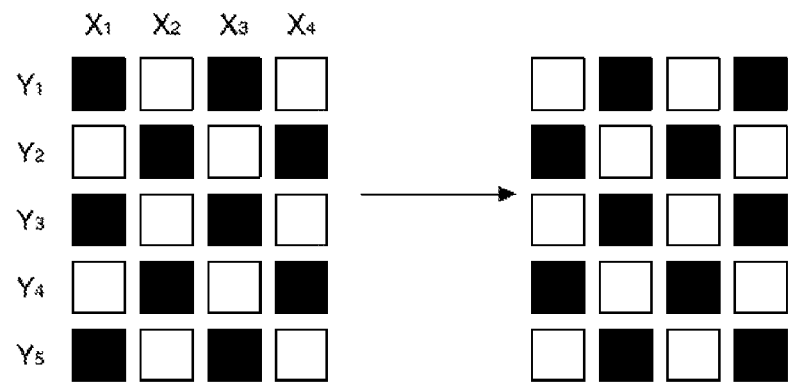
FIG. 10 shows a diagram exemplifying an image which is written in a first operation mode.

FIG. 10 is a diagram exemplifying an image which is written in the first operation mode. The left part in FIG. 10 shows an image before rewriting, and the right part in FIG. 10 shows an image after rewriting. For simplicity of description, only pixels of five rows and four columns are shown. The binarization process is performed using a dither matrix where a spatial frequency is high in the first operation mode, and thereby there are cases where a frequency of grayscale variations is increased when attention is paid to a certain column in a case where grayscale values before and after the rewriting are different. FIG. 10 shows an example which is easiest to understand. In this example, grayscales of all the pixels of five rows and four columns are changed, and, in the grayscales after the change, one white and one black pixel alternately appear in the column direction.

Figure 11:
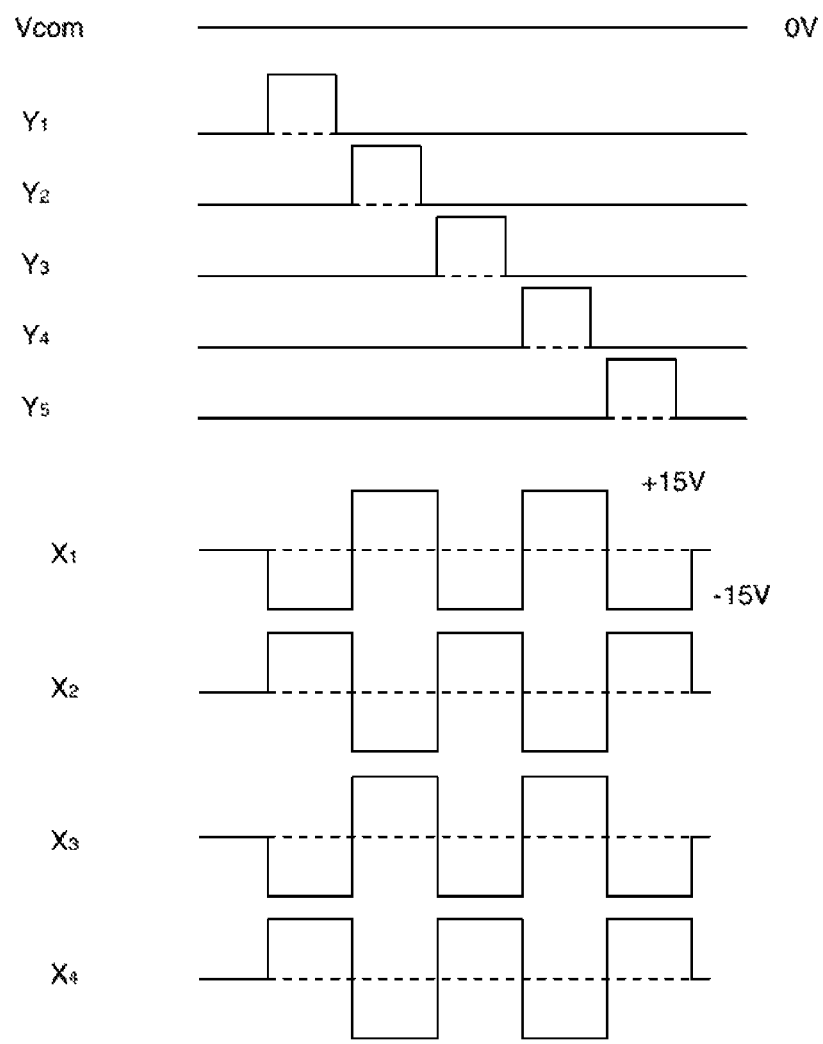
FIG. 11 shows a diagram exemplifying signals supplied to scanning lines and data lines.

FIG. 11 is a diagram exemplifying signals supplied to the scanning lines 11 and the data lines 12 in the example of FIG. 10. During a certain frame, the scanning lines 11 in the first row to the fifth row are sequentially and exclusively selected. Since grayscales of the pixels adjacent in the column direction (longitudinal direction) are varied by one pixel, the signals supplied to the data lines 12 are signals of which voltages are varied with an amplitude of 30 V for each horizontal period. Since the data lines 12 have parasitic capacitances, if the voltages are varied at such a high frequency, power is consumed more than a case where voltages are varied at a low frequency.

FIG. 7 is referred to again. In step S150, the controller 2 performs the binarization process (color quantization process) in the second operation mode. The controller 2 writes the binarized image data to the binary data storage region 53 of the RAM 5. In step S160, the controller 2 performs a writing operation for the pixels 13.

Figure 12:
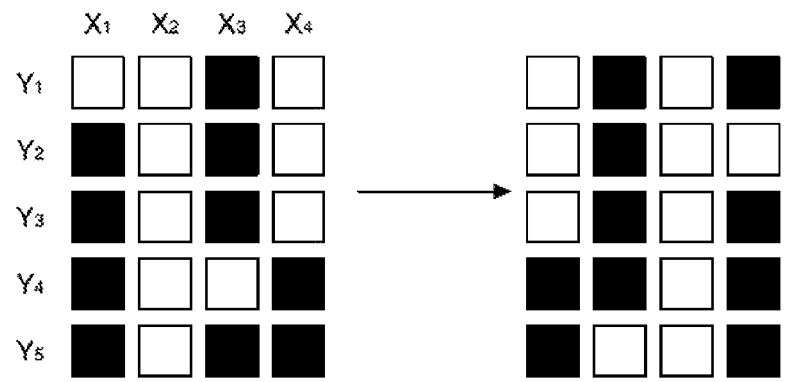
FIG. 12 shows a diagram exemplifying an image which is written in a second operation mode.

FIG. 12 is a diagram exemplifying an image which is written in the second operation mode. The left part in FIG. 12 is an image before the rewriting, and the right part in FIG. 12 is an image after the rewriting. Since the binarization process is performed using the dither matrix having the spatial frequency lower than the first operation mode in the second operation mode, a ratio where grayscale values before and after the rewriting are different is lower than that of the first operation mode. In addition, in a case where grayscale values before and after the rewriting are different, a frequency of grayscale variations when attention is paid to a certain column is lower than that of the first operation mode.

Figure 13:
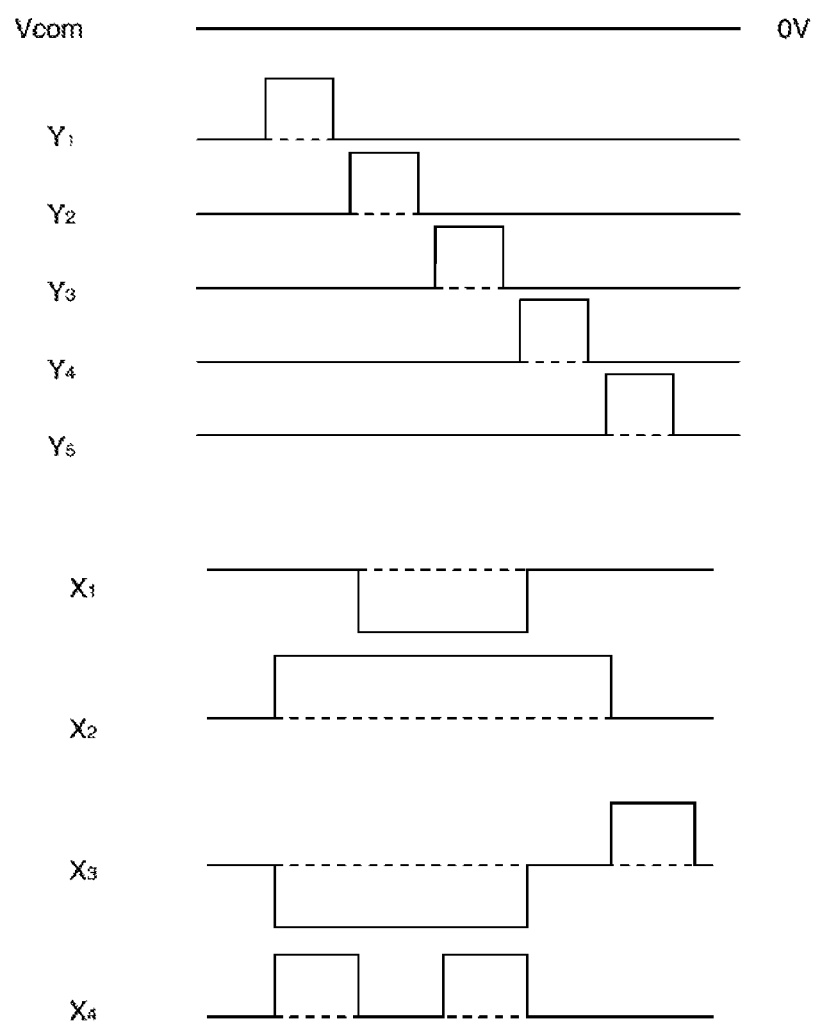
FIG. 13 shows a diagram exemplifying signals supplied to the scanning lines and the data lines.

FIG. 13 is a diagram exemplifying signals supplied to the scanning lines 11 and the data lines 12 in the example of FIG. 12. For example, in relation to the pixels 13 in the first column, grayscales are not changed in the first, fourth and fifth rows, and grayscales are changed from black to white in the second and third rows. Then, a voltage of the signal supplied to the data line 12 in the first column is varied only twice and has an amplitude of 15 V. It is clear that power consumption is low as compared with an example of the first operation mode in FIG. 11 (the voltage of the signal supplied to the data line 12 in the first column is varied six times and has an amplitude of 30 V).

Next, an image writing operation will be described in detail in steps S110 and S160. In the electronic apparatus 1000, a display state of a pixel is varied through an application of a voltage over a plurality of frames (accumulation of charge) from white (low density or low grayscale) to black (high density or high grayscale) or from black to white. That is to say, the pixel does not reach a desired display state through a voltage application only for one frame.

Figure 14:
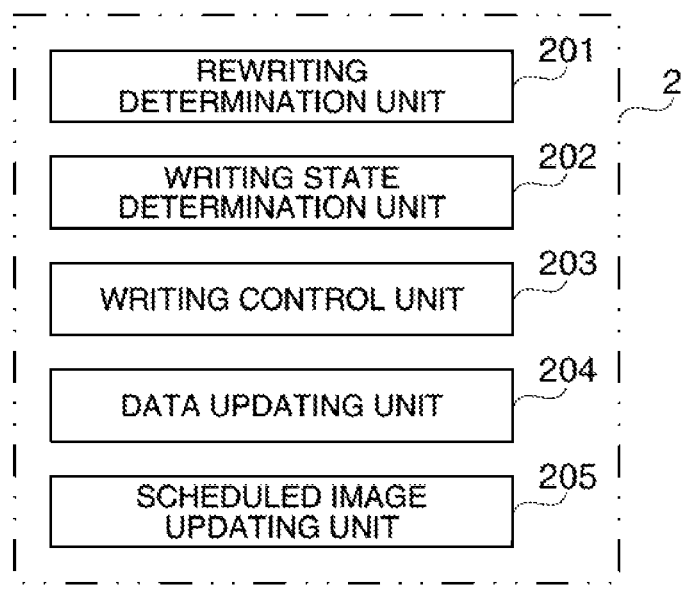
FIG. 14 shows a block diagram illustrating a functional configuration of the controller.

FIG. 14 is a block diagram illustrating a functional configuration of the controller 2. The controller 2 includes a rewriting determination unit 201, a writing state determination unit 202, a writing control unit 203, a data updating unit 204, and a scheduled image updating unit 205. These functions are realized using hardware. As another example, a processor may be provided in the controller 2, and the processor may execute programs, thereby realizing each block. The controller 2 has such functions along with the functions described in FIG. 6.

The rewriting determination unit 201 compares image data which is stored in the binary data storage region 53 with image data which is stored in the scheduled image data storage region 52, and determines whether or not both of them are different from each other. The writing state determination unit 202 determines whether or not rewriting for varying a pixel from black to white or from white to black progresses by referring to data stored in the written data storage region 51. The written data storage region 51 includes a white written data storage region 51A which stores data (first written data) indicating whether or not an operation where a display state is changed from black to white progresses for each pixel, and a black written data storage region 51B which stores data (second written data) indicating whether or not an operation where a display state is changed from white to black progresses for each pixel.

The writing control unit 203 controls the scanning line driving circuit 15 and the data line driving circuit 16 such that a data signal is supplied to the pixel electrode 104 of a desired pixel. The data updating unit 204 writes data in the white written data storage region 51A and the black written data storage region 51B. The scheduled image updating unit 205 overwrites the image data stored in the scheduled image data storage region 52 with the image data stored in the binary data storage region 53.

Figure 15:
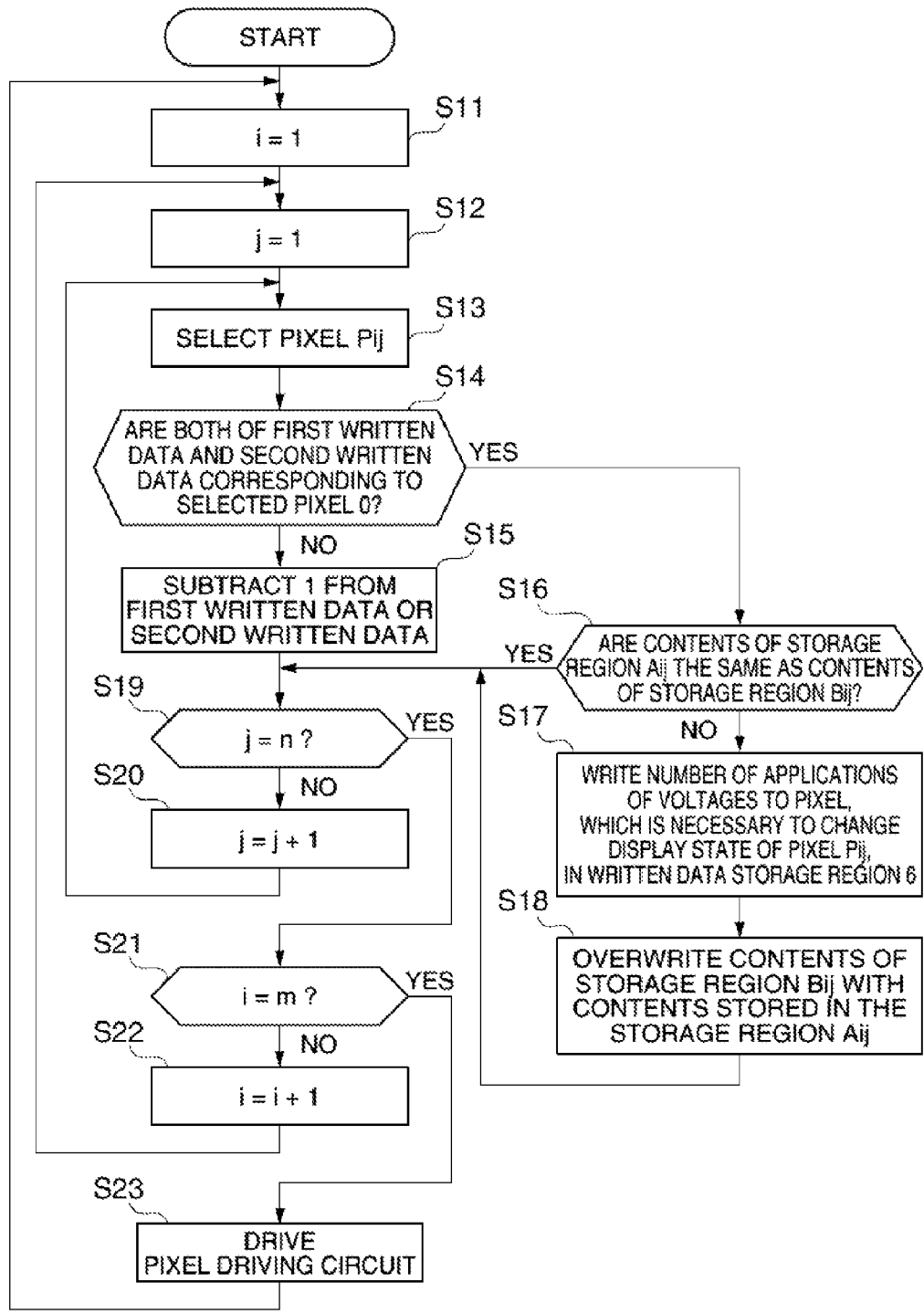
FIG. 15 shows a flowchart illustrating a driving process of the display unit of the controller.

FIG. 15 is a flowchart illustrating a driving process of the display unit 1 by the controller 2. Hereinafter, a pixel in the i-th row and the j-th column of the display unit 1 is denoted by a pixel Pij. A region which stores data indicating a grayscale of the pixel Pij is referred to as a storage region Aij in the binary data storage region 53. In this example, data stored in the storage region Aij is binary of 0 (black) or 7 (white). In the scheduled image data storage region 52, a region which stores scheduled image data of the pixel Pij is referred to as a storage region Bij. The scheduled image data refers to data which indicates a state of the display unit 1 when a writing process in progress is finished. In this example, data stored in the storage region Bij is binary of 0 (black) or 7 (white). The written data storage region 51 includes the white written data storage region 51A and the black written data storage region 51B. The white written data storage region 51A stores the number of remaining voltage applications in relation to a pixel which rewrites a grayscale from black to white as the first written data. The black written data storage region 51B stores the number of remaining voltage applications in relation to a pixel which rewrites a grayscale from white to black as the first written data. In the white written data storage region 51A, a region which stores data indicating the number of remaining voltage applications of the pixel Pij is referred to as a storage region Cij. In the black written data storage region 51B, a region which stores data indicating the number of remaining voltage applications of the pixel Pij is referred to as a storage region Dij.

In steps S11 and S12, the writing state determination unit 202 initializes values of variables i and j. In this example, the variables i and j are initialized to i=1 and j=1. In step S13, the writing state determination unit 202 selects the pixel Pij specified by the variables i and j. For example, if a value of the variable i is 1 and a value of the variable j is 1, a pixel P11 is selected.

In step S14, the writing state determination unit 202 determines whether or not both of the first written data stored in the storage region Cij and the second written data stored in the storage region Dij are 0. That is to say, the writing state determination unit 202 determines whether or not a writing process for the pixel Pij is in progress. If both of the first written data and the second written data are 0 with regard to the pixel Pij (step S14: YES), the flow proceeds to step S16 where the writing state determination unit 202 performs a process. If one of the first written data and the second written data is 0 with regard to the pixel Pij (step S14: NO), the flow proceeds to step S15 where the writing state determination unit 202 performs a process.

In step S15, the data updating unit 204 subtracts 1 from data having a value other than 0 of the first written data and the second written data. In addition, the data updating unit 204 does not subtract 1 from data having a value of 0 of the first written data and the second written data. In step S19, the data updating unit 204 determines whether or not a value of the variable j is the same as the number n of the data lines. If the value of the variable j is not n (step S19: NO), the data updating unit 204 adds 1 to the value of the variable j (step S20). If 1 is added to the value of the variable j, the flow proceeds to step S13 where the data updating unit 204 performs a process. If the value of the variable j is n (step S19: YES), the flow proceeds to step S21 where the data updating unit 204 performs a process. In step S21, the data updating unit 204 determines whether or not a value of the variable i is the same as the number m of the scanning lines. If the value of the variable i is not m (step S21: NO), the data updating unit 204 adds 1 to the value of the variable i (step S22). If 1 is added to the value of the variable i, the flow proceeds to step S12 where the data updating unit 204 performs a process. If the value of the variable i is m (step S21: YES), the flow proceeds to step S23 where the data updating unit 204 performs a process. In step S23, the writing control unit 203 drives pixel driving circuits by controlling the scanning line driving circuit 15 and the data line driving circuit 16.

In step S16 (determination step), the rewriting determination unit 201 determines whether or not data stored in the storage region Aij and data stored in the storage region Bij are the same. If both pieces of data are different from each other (step S16: NO), the flow proceeds to step S17 where the rewriting determination unit 201 performs a process.

In step S17 (data updating step), the data updating unit 204 writes the number of applications of voltages to the pixel, which is necessary to change a grayscale of the pixel Pij to a grayscale of the storage region Aij, in the written data storage region 51. In step S18, the scheduled image updating unit 205 overwrites contents of the storage region Bij with contents stored in the storage region Aij.

Figure 16:
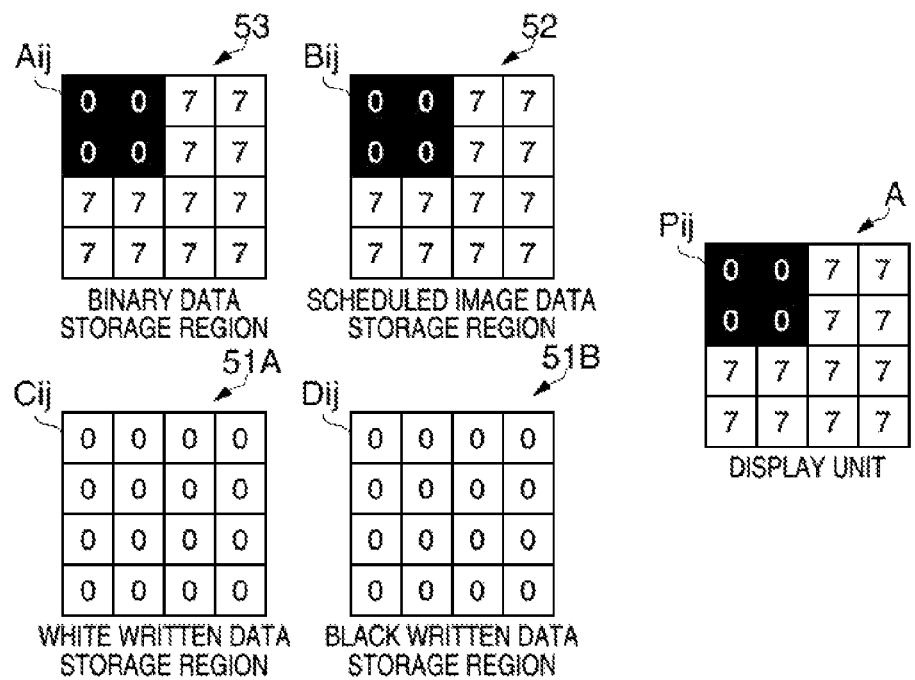
FIG. 16 shows a diagram exemplifying data stored in a memory.

FIG. 16 is a diagram exemplifying data stored in the memory. Here, pixels P11 to P44 of four rows and four columns which are a portion of the display unit 1 will be described as an example. In this example, grayscales of the pixels are indicated by eight steps of 0 to 7. The grayscale 7 corresponds to white and the grayscale 0 corresponds to black. Although numerical values are disclosed in the pixels for better understanding of the figures, the numerical values are not displayed. In the example in FIG. 16, the pixels P11, P12, P21 and P22 are black, and the remaining pixels are white. There is no pixel in which writing is in progress, and all the pixels are in a written state.

Figure 17:
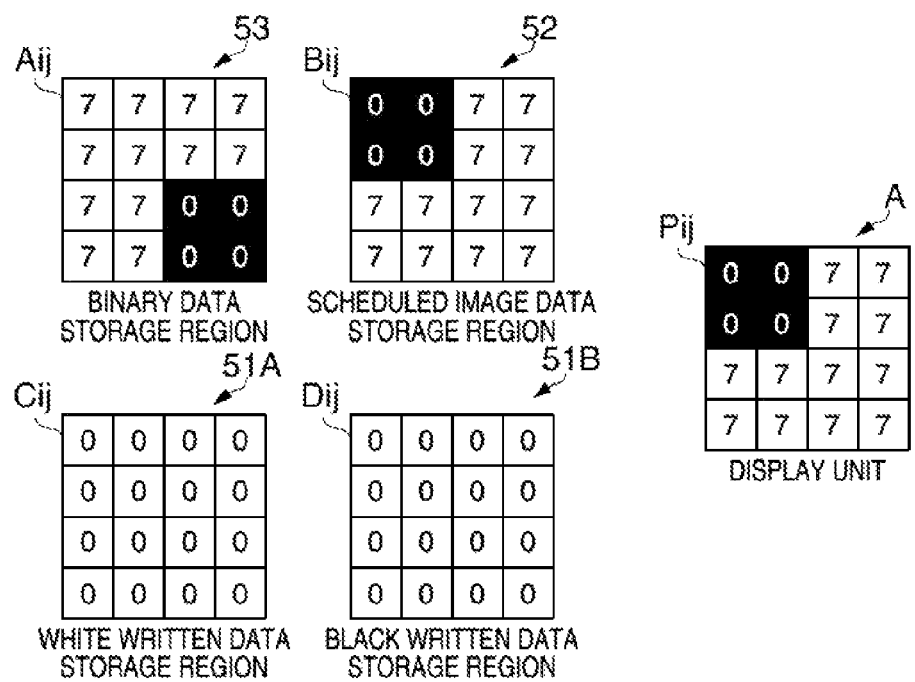
FIG. 17 shows a diagram exemplifying a state where a binary data storage region is rewritten.

FIG. 17 is a diagram exemplifying a state where the binary data storage region 53 is rewritten. In this example, the pixels P33, P34, P43 and P44 are black, and the remaining pixels are white. Rewriting in the binary data storage region 53, that is, writing of data in the binary data storage region 53 (data writing step) is performed by the control unit 3. Now, a case where the pixel P11 is selected in step S13 in a state of FIG. 17 will be described as an example. In this case, since both pieces of data stored in storage regions C11 and D11 are 0, a determination result in step S14 is YES. Next, data of a storage region A11 is different from data of a storage region B11, and thus a determination result in step S16 is NO. In step S17, the data of the storage region B11 is written in the storage region C11. In step S18, the data of the storage region A11 is written in the storage region B11.

Figure 18:
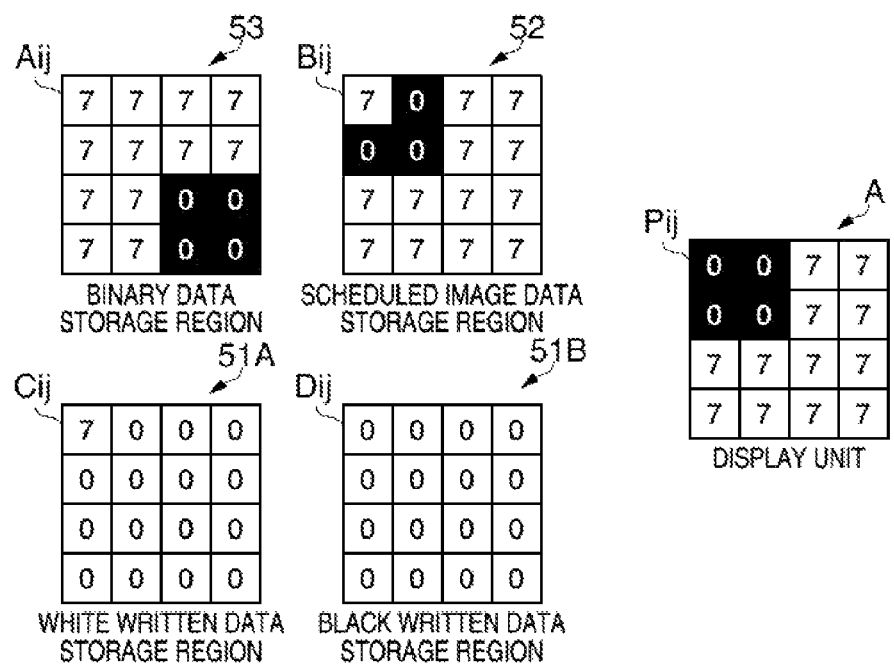
FIG. 18 shows a diagram exemplifying a state where data of a storage region is rewritten.

FIG. 18 is a diagram exemplifying a state where data of the storage region B11 is rewritten. Next, a target pixel is updated to the pixel P12. Both pieces of data stored in storage regions C12 and D12 are 0, and thus a determination result in step S14 is YES. Next, data of a storage region A12 is different from data of a storage region B12, and thus a determination result in step S16 is NO. In step S17, data indicating the number of voltage applications (in this example, seven times) is written in the storage region C12. In step S18, the data of the storage region A12 is written in the storage region B12.

Figure 19:
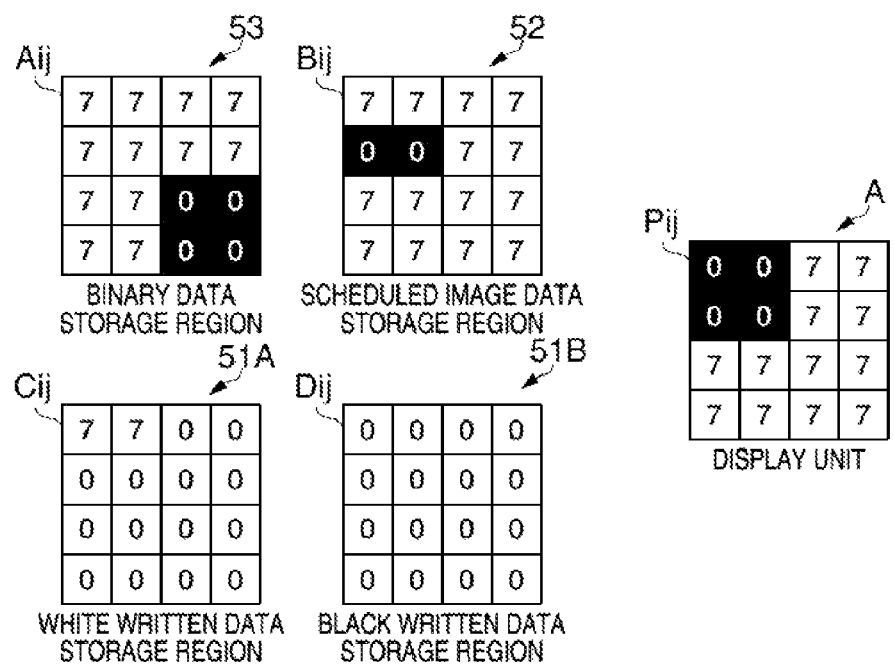
FIG. 19 shows a diagram exemplifying a state where data of a storage region is rewritten.

FIG. 19 is a diagram exemplifying a state where data of the storage region B12 is rewritten. If the process proceeds to the pixel P44 in the same manner, the data stored in the scheduled image data storage region 52 is the same as the data stored in the binary data storage region 53.

Figure 20:
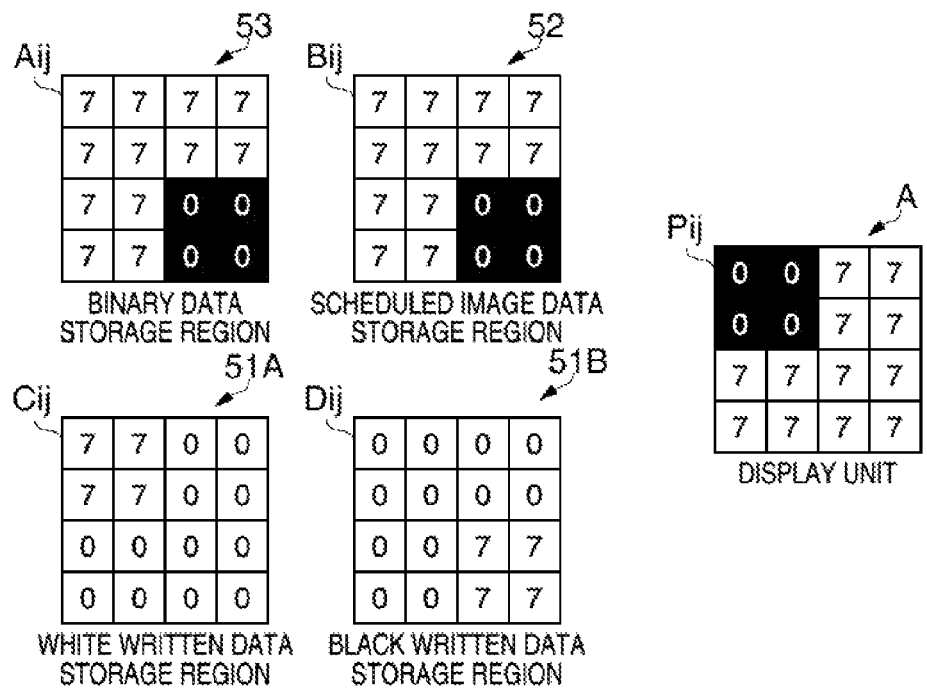
FIG. 20 shows a diagram exemplifying a state where data for all the pixels is rewritten.

FIG. 20 is a diagram exemplifying a state where data for all the pixels is rewritten. In the pixels of which grayscales are rewritten from black to white, the data stored in the storage regions Cij (C11, C12, C21, and C22) is "7". In the pixels of which grayscales are rewritten from white to black, the data stored in the storage regions Dij (D33, D34, D43, and D44) is "7". In the storage regions Cij and Dij, data of the other pixels is "0".

If the rewriting of data is completed, the writing control unit 203 drives the display unit 1. When the scanning line in the i-th row is selected, the writing control unit 203 performs a control such that a voltage which causes a potential of the pixel electrode 104 to be lowered with respect to the potential Vcom of the transparent electrode 122 is applied to the pixels other than pixels where data of the storage region Cij is 0. The writing control unit 203 performs a control such that a voltage which causes a potential of the pixel electrode 104 (hereinafter, a potential difference between the pixel electrode 104 and the transparent electrode 122 with respect to the potential Vcom of the transparent electrode 122 is simply referred to as a "pixel voltage") to be heightened with respect to the potential Vcom of the transparent electrode 122 is applied to the pixels other than pixels where data of the storage region Dij is 0. For example, in relation to the pixel P11, data stored in the storage region C11 is not 0. Therefore, when the scanning line in the first row is selected, a voltage which causes the pixel voltage to be −15 V is applied to the data line in the first column. As another example, in relation to the pixel P33, data stored in a storage region D33 is not 0. Therefore, when the scanning line in the third row is selected, a voltage which causes the pixel voltage to be +15 V is applied to the data line in the third column. In addition, in relation to the pixel Pij where both of data of the storage region Cij and data of the storage region Dij are 0, a voltage which causes the pixel voltage to be 0 V is applied to the data line in the j-th row.

Figure 21:
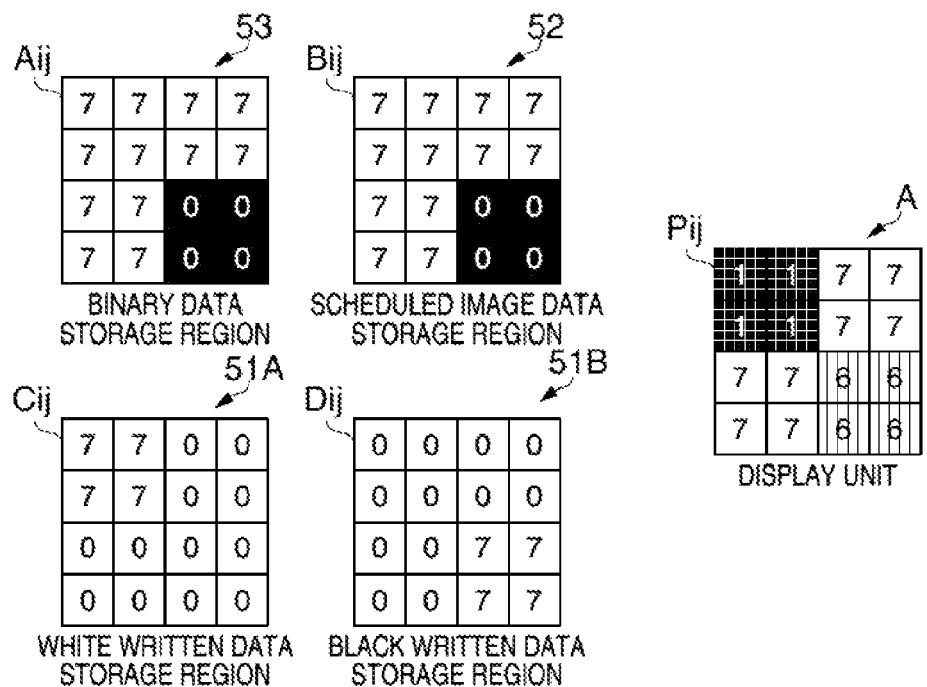
FIG. 21 shows a diagram exemplifying a state where a voltage during one frame is applied from the state shown in FIG. 20.

FIG. 21 is a diagram exemplifying a state where a voltage is applied for one frame from the state shown in FIG. 20. In the pixels of the display unit 1, charged particles are moved, and thereby grayscales are varied. In this example, the pixels P11, P12, P21 and P22 have a bright grayscale from black by a voltage application for one frame, and pixels P33, P34, P43 and P44 have a dark grayscale from white by a voltage application for one frame.

When the voltage application for one frame is completed, the processes by the controller 2 are repeated from step S11 again. If the pixel P11 is selected in step S13 in the state of FIG. 21, since the data stored in the storage region C11 is not 0, a determination result in step S14 is NO. In step S15, 1 is subtracted from the data (data which is not 0) stored in the storage region C11, and thus the data of the storage region C11 becomes 6. In the same manner, data of the storage regions is rewritten for all the pixels.

Figure 22:
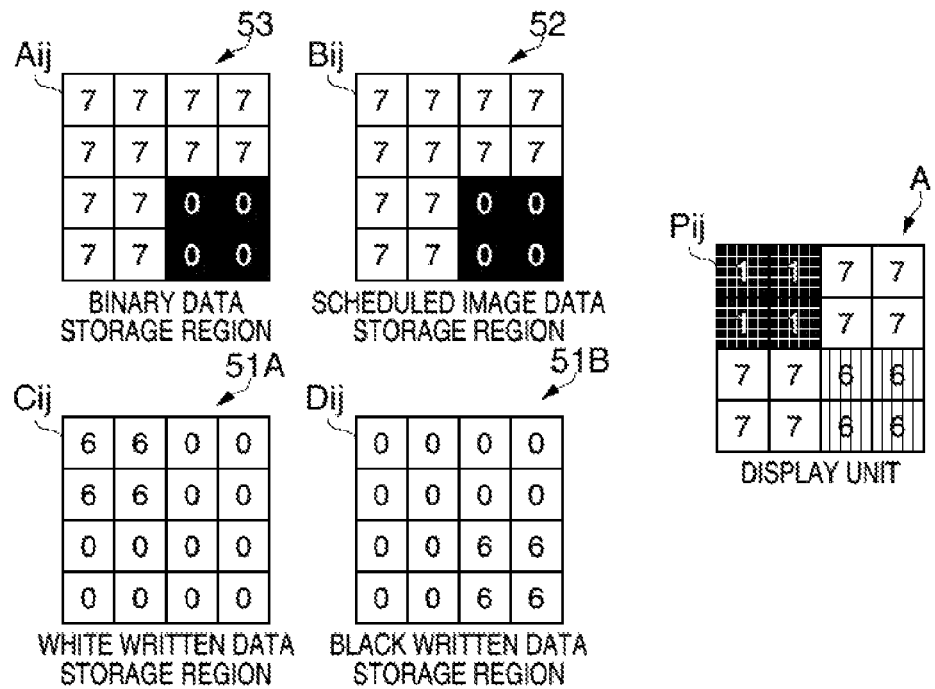
FIG. 22 shows a diagram exemplifying a state where rewriting of data of a written data storage region is completed.

FIG. 22 is a diagram exemplifying a state where rewriting of data of the written data storage region is completed for all the pixels. Upon comparison with the state shown in FIG. 21, there is a difference in that the data of the storage regions C11, C12, C21 and C22, and the data of the storage regions D33, D34, D43 and D44 are 6.

Figure 23:
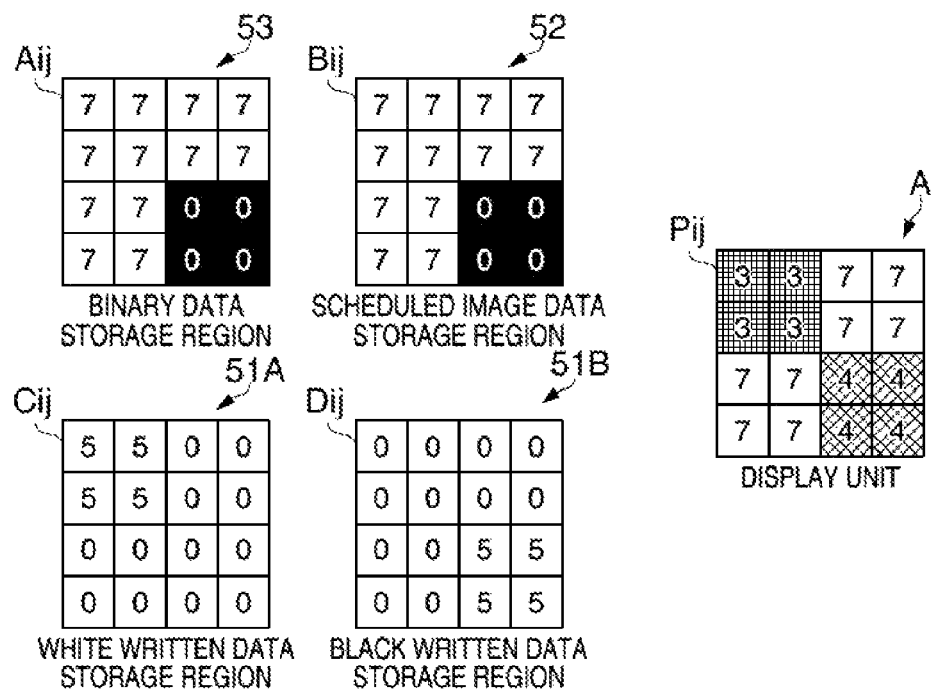
FIG. 23 shows a diagram exemplifying a state shortly after a process in the second step S23 is performed.

FIG. 23 is a diagram illustrating a state shortly after the process in step S23 is secondly performed from the state shown in FIG. 22. Upon comparison with the state shown in FIG. 22, there is a difference in that the data of the storage regions C11, C12, C21 and C22, and the data of the storage regions D33, D34, D43 and D44 are 5. In addition, there is also difference with the state in FIG. 22 in that the grayscales of the pixels P11, P12, P21 and P22 are 3, and the grayscales of the pixels P33, P34, P43 and P44 are 4 in the display unit 1. Here, there is an assumption of an operation of the case where the data of the binary data storage region 53 is rewritten in the state shown in FIG. 23 (shortly after the process in step S23 is secondly performed).

Figure 24:
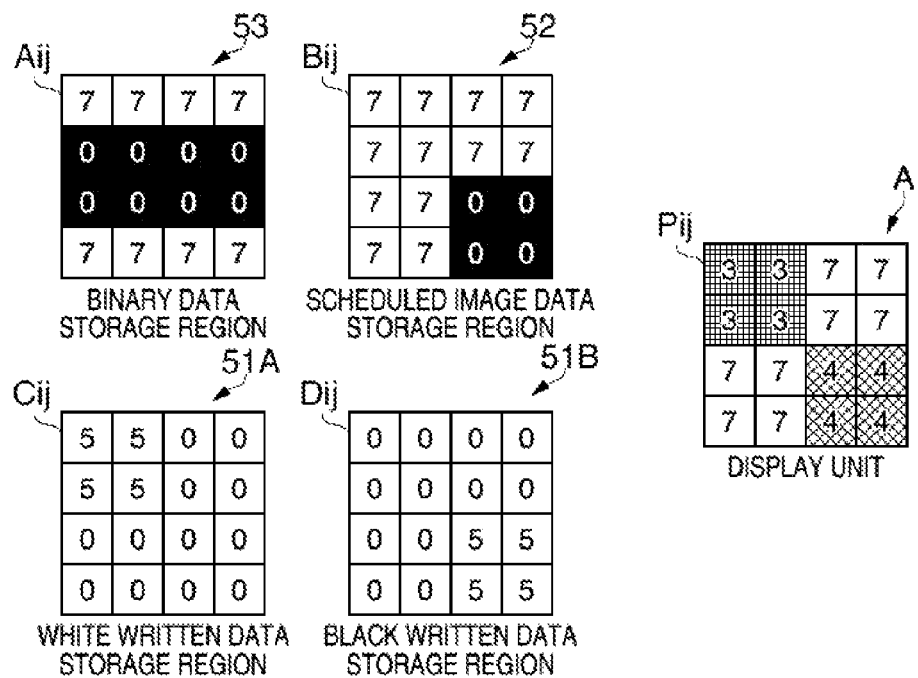
FIG. 24 shows a diagram exemplifying a state where data of the binary data storage region is rewritten.

FIG. 24 is a diagram exemplifying a state where the data of the binary data storage region 53 is rewritten. In this example, the pixels in the first and fourth rows are all white, and the pixels in the second and third rows are all black. In this state, the controller 2 performs the process from step S11. For example, if the pixel P21 is selected in step S13, a determination result in step S14 is NO. In step S15, 1 is subtracted from the data of the storage region C21 which becomes 4. As another example, if the pixel P23 is selected in step S13, a determination result in step S14 is YES. In addition, a determination result in step S16 is NO. Therefore, the flow proceeds to step S17. In step S17, 7 is written as data of a storage region D23. In step S18, data of a storage region A23 is written as data of a storage region B23. As such, even if the data of the binary data storage region 53 is rewritten, the writing operation in progress (the writing operation of the pixels based on the data of the binary data storage region 53 before the rewriting) continues as it is in the pixels where the writing operation is in progress (in the example shown in FIG. 24, the pixels P11, P12, P21, P22, P33, P34, P43 and P44). On the other hand, in the pixels where the writing operation is not in progress (the pixels P13, P14, P23, P24, P31, P32, P41 and P42), the writing operation of the pixels is performed based on the rewritten data of the binary data storage region 53.

Figure 25:
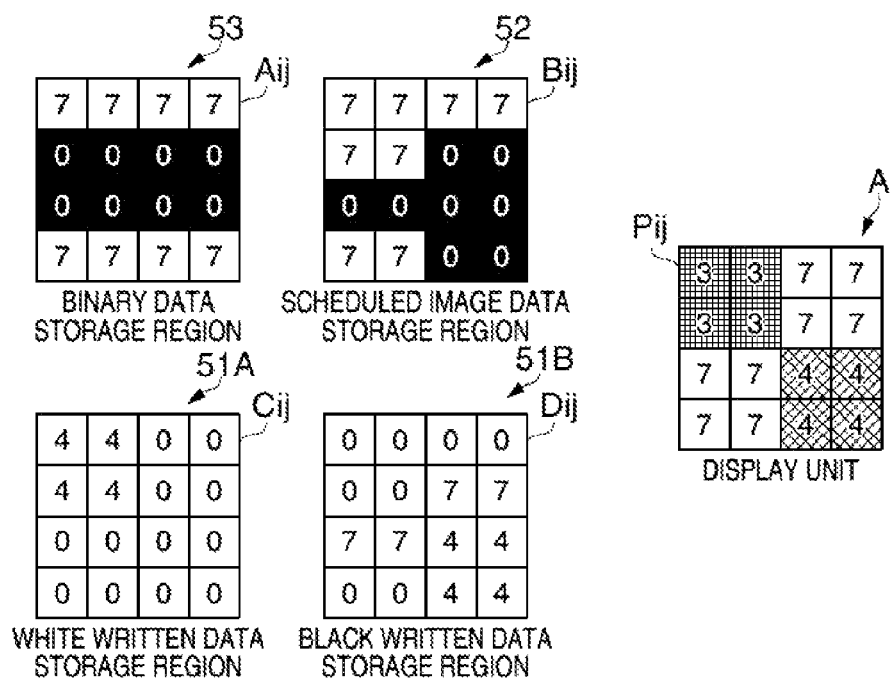
FIG. 25 shows a diagram exemplifying rewriting of data for all the pixels is completed.

FIG. 25 is a diagram exemplifying a state where rewriting of data is completed for all the pixels from the state shown in FIG. 24. Upon comparison with the state shown in FIG. 24, there is a difference in that the data of the storage regions B23, B24, B31 and B32 is rewritten to 0. In addition, there is a difference in that the data of storage regions C11, C12, C21, C22, D33, D34, D43 and D44 is rewritten to 4. Further, there is a difference in that the data of the storage regions D23, D24, D31 and D32 is rewritten to 7.

Figure 26:
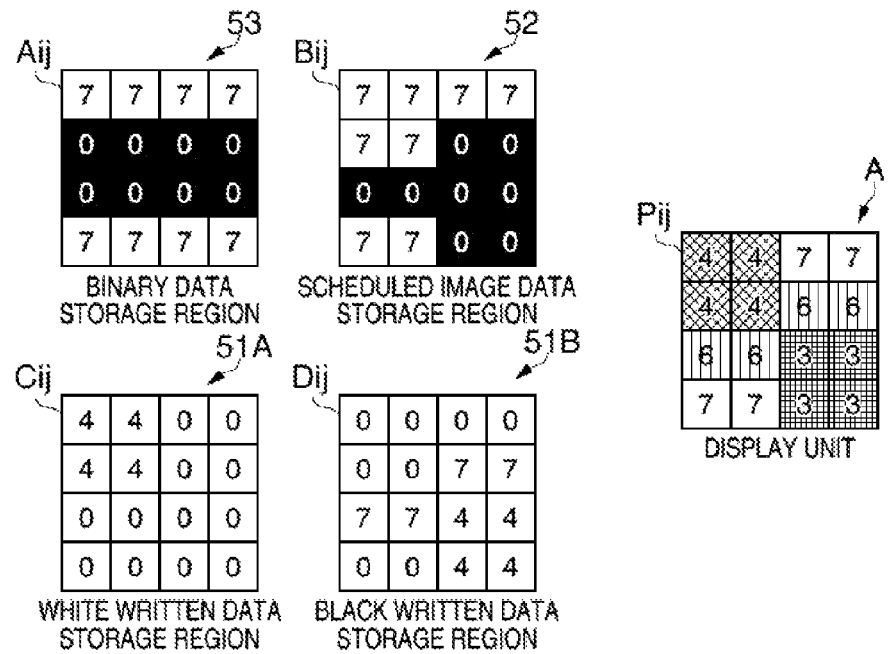
FIG. 26 shows a diagram exemplifying a state where a process in step S23 from the state shown in FIG. 25 is performed.

FIG. 26 is a diagram exemplifying a state where the process in step S23 is performed from the state shown in FIG. 25. In the pixels (the pixels P11, P12, P21, P22, P33, P34, P43 and P44) where the writing operation has already been in progress before the data of the binary data storage region 53 is rewritten, a previous writing operation continues without being based on the rewritten data of the binary data storage region 53. In the pixels (the pixels P13, P14, P31 and P32) where the writing operation is not performed before the data of the binary data storage region 53 is rewritten of the pixels where the rewriting is necessary after the data of the binary data storage region 53 is rewritten, the pixel rewriting is started based on the rewritten data of the binary data storage region 53.

Figure 27:
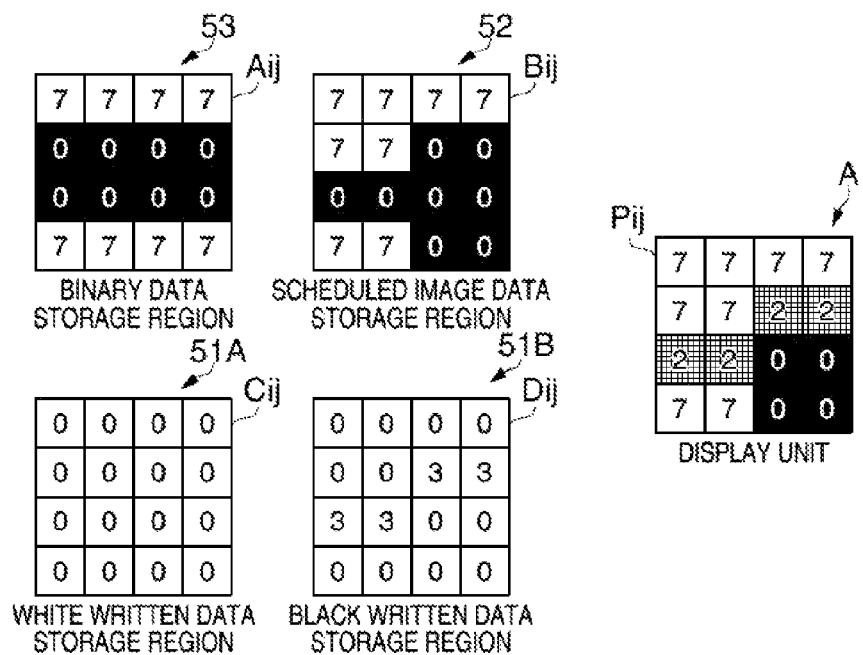
FIG. 27 shows a diagram exemplifying a state where a predetermined number of voltage applications are completed.

FIG. 27 is a diagram exemplifying a state where a predetermined number of voltage applications are completed for the pixels (the pixels P11, P12, P21, P22, P33, P34, P43 and P44) where the writing operation further progresses from FIG. 26 and the writing operation has already been in progress before the data of the binary data storage region 53 is rewritten. In this state, in the written data storage region 51, the data of the storage regions D23, D24, D31 and D32 is 3, and the data of the other storage regions is 0. In the display unit 1, the grayscales of the pixels P23, P24, P31 and P32 are 2. The grayscales of the pixels P33, P34, P43 and P44 are 0. The grayscales of the remaining pixels are 7. In this state, for example, there is an assumption of a case where the pixel P21 is selected in step S13. In this case, a determination result in step S14 is YES. In addition, a determination result in step S16 is NO. In step S17, 7 is written as data of a storage region D21. In step S18, 0 which is the same as data of a storage region A21 is written in a storage region B21 as data.

Figure 28:
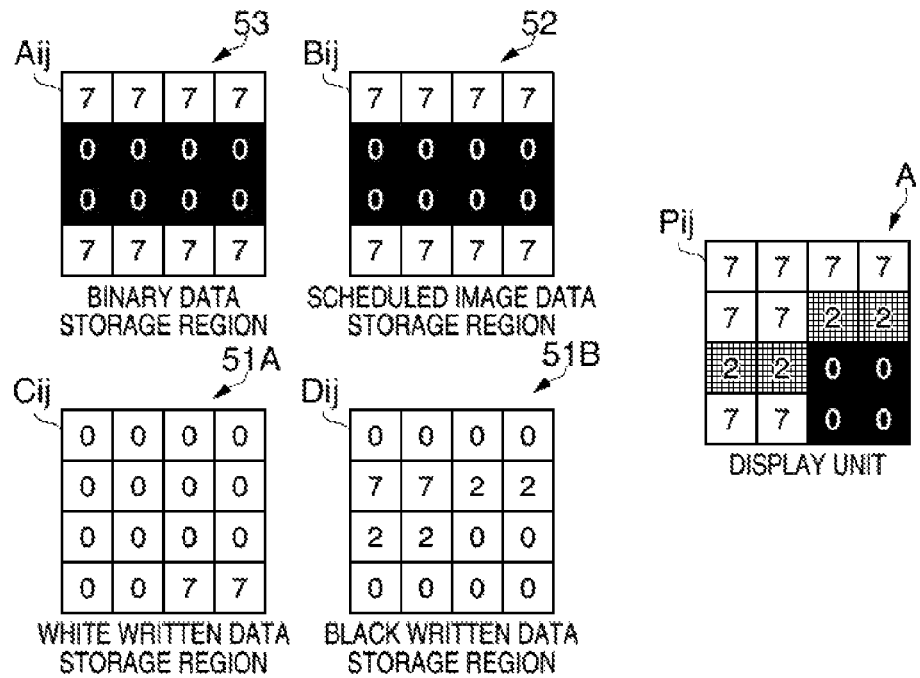
FIG. 28 shows a diagram exemplifying a state where rewriting of data for all the pixels is completed.

FIG. 28 is a diagram exemplifying a state where rewriting of data is completed for all the pixels. Upon comparison with FIG. 27, there is a difference in that the values of the storage regions B21 and B22 are 7, and data of storage regions B43 and B44 are 0. In addition, there is a difference in that the data of the storage regions C43, C44, D21 and D22 are 7. Further, there is a difference in that the data of the storage regions D23, D24, D31 and D32 are 2.

Figure 29:
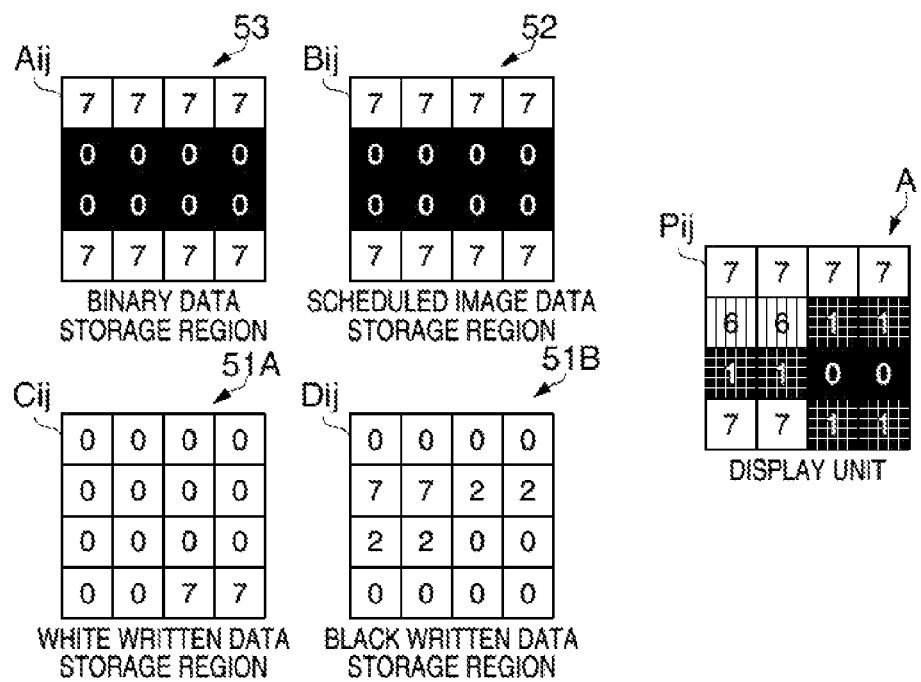
FIG. 29 shows a diagram exemplifying a state where rewriting of pixels from the state shown in FIG. 28 is performed.

FIG. 29 is a diagram exemplifying a state where pixel rewriting is performed from the state shown in FIG. 28. Upon comparison with the state shown in FIG. 28, there is a difference in that the grayscales of the pixels P23, P24, P31 and P32 are 1. In addition, there is a difference in that the grayscales of the pixels P21 and P22 are 6, and the grayscales of the pixels P43 and P44 are 1.

Figure 30:
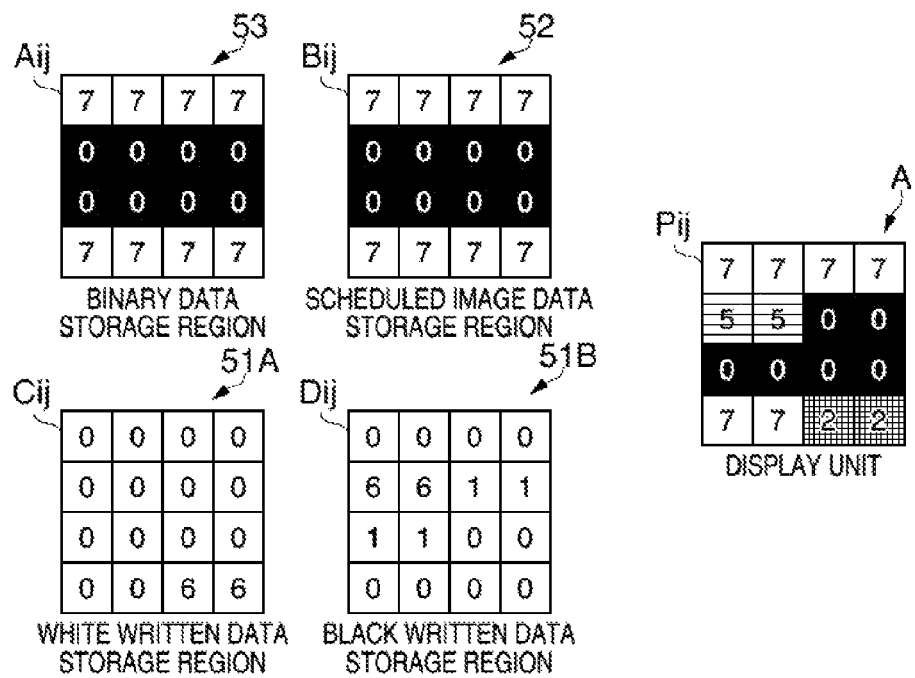
FIG. 30 shows a diagram exemplifying a state where a process progresses by one frame from the state shown in FIG. 29.

FIG. 30 is a diagram exemplifying a state where the process progresses for one frame from the state shown in FIG. 29. Upon comparison with the state shown in FIG. 29, there is a difference in that the grayscales of the pixels P23, P24, P31 and P32 are 0. In addition, there is a difference in that the grayscales of the pixels P21 and P22 are 5, and the grayscales of the pixels P43 and P44 are 2. In addition, there is a difference in that the data of the storage regions C43, C44, D21 and D22 are 6. Further, there is a difference in that the data of the storage regions D23, D24, D31 and D32 are 1.

Figure 31:
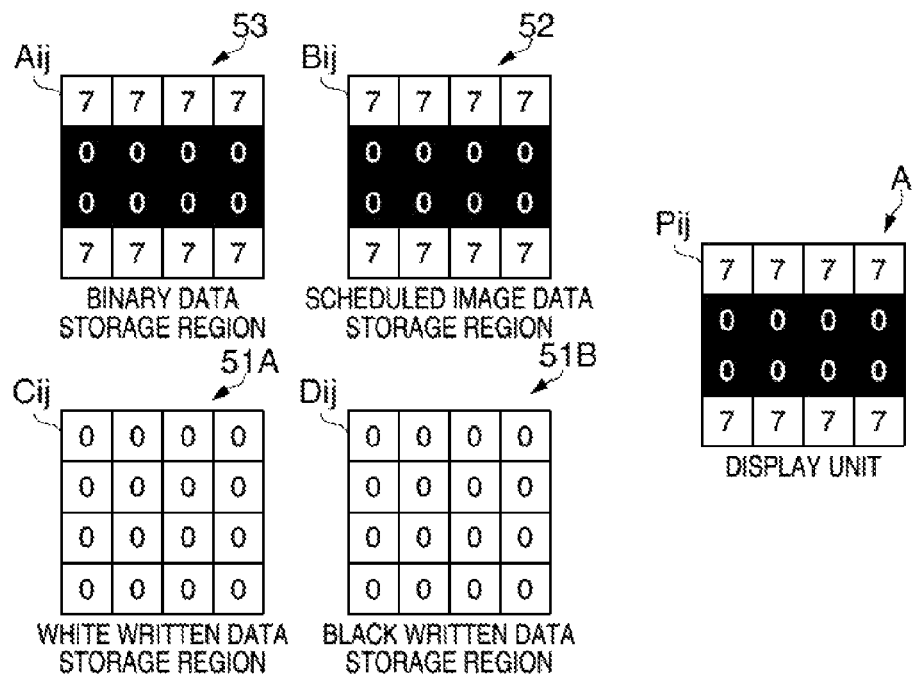
FIG. 31 shows a diagram exemplifying a state where a process progresses from the state shown in FIG. 30.

FIG. 31 is a diagram exemplifying a state where the process progresses from the state shown in FIG. 30. In this state, the data of the binary data storage region 53 corresponds with the grayscales of the display unit 1. In addition, all pieces of data stored in the written data storage region are 0, and a state where the writing operation for all the pixels is finished is shown.

To summarize, in the display writing operation, the display unit 1 includes a plurality of pixels, and grayscales of the pixels are changed through the writing operation where voltages are applied multiple times to the pixels. The display writing operation includes a step (step S16) where image data indicating an image which is newly displayed on the display unit 1 is compared with scheduled image data indicating an image which is scheduled to be displayed on the display unit 1 through a writing operation in progress, and a pixel of which a grayscale is to be changed is determined of the plurality of pixels, and a step (step S23) where, if the pixel determined as a pixel of which a grayscale is to be changed is not being written, the pixel is started to be written so as to have a grayscale set by the image data, and if the pixel determined as a pixel of which a grayscale is to be changed is being written in the determination step, the pixel is started to be written so as to have a grayscale set by the image data after the writing operation in progress is completed.

According to the present embodiment, even in a case where a region where rewriting is started first partially overlaps a region where rewriting is newly performed, the rewriting is instantly started for a part where the rewriting is not in progress when the new rewriting is started. Therefore, a user experiences a high display speed. In addition, according to the present embodiment, it is possible for pixels to which a positive voltage is applied and pixels to which a negative voltage is applied to coexist in a single frame (as such, driving where both of the positive voltage and the negative voltage can be selected for a single frame is referred to as "bipolar driving").

As described above, according to the present embodiment, the first operation mode (relatively high power consumption) and the second operation mode (relatively low power consumption) may be divided and used depending on the situation. It is possible to perform display using the area grayscale with lower power consumption as compared with a case where only the first operation mode, the single operation mode is used.

3. Other Embodiments

The present invention is not limited to the above-described embodiment but may be implemented by many embodiments. Hereinafter, modified examples will be described. Two or more modified examples of the following modified examples may be used by combinations thereof.

3-1. Modified Example 1

An image writing operation is not limited to that described with reference to the flow in FIG. 15. In the modified example 1, the RAM 5 includes storage regions storing image data before being rewritten and storage regions storing image data after being rewritten. All the pieces of data are binarized. The controller 2 compares these pieces of data for each pixel 13 and controls the data line driving circuit 16 such that the voltage +15 V is applied to the data line 12 corresponding to the pixel 13 where rewriting is performed from white to black, and the voltage −15 V is applied to the data line 12 corresponding to the pixel 13 where rewriting is performed from black to white. In the writing operation according to the modified example 1, unlike the flow in FIG. 15, in a case where data of the VRAM 4 is rewritten during the writing operation (for example, a case as shown in FIG. 24), a previous writing operation continues until voltage applications of seven times are finished. After the previous writing operation is completely finished, a writing operation is newly started based on the rewritten data of the VRAM 4. According to this example, since the written data storage region 51 is unnecessary, an amount of a memory to be used and access to the memory are reduced as compared with the flow in FIG. 15. However, time taken to be rewritten is lengthened as compared with the flow in FIG. 15.

3-2. Modified Example 2

The first condition and the second condition are not limited to those described in the embodiment. In the modified example 2 as well, when the flow in FIG. 15 is finished, that is, the data stored in the binary data storage region 53 and the scheduled image data storage region 52 is in a corresponding state, and the number of voltage applications stored in the written data storage region 51 entirely becomes 0, an image is rewritten again based on the data stored in the binary data storage region 53. The first condition is a condition that an initial writing operation is in progress, that is, a condition that the number of voltage applications other than 0 is stored in the written data storage region 51. The second condition is a condition that the initial writing operation is finished, that is, a condition that the number of voltage applications stored in the written data storage region 51 entirely becomes 0. According to the modified example 2, the binarization process is performed in the second operation mode when the writing operation according to the flow in FIG. 15 is in progress, and the binarization process is performed in the first operation mode after the flow in FIG. 15 is finished.

In this example, the controller 2 performs the binarization process for the data stored in the VRAM 4 using the first dither matrix when the writing operation according to FIG. 15 is finished (that is, the binarization process is performed in the first operation mode). If the binarization process is performed in the first operation mode, the controller 2 performs an operation for image writing. The operation at this time is performed as follows without depending on the flow in FIG. 15. First, the controller 2 performs a refresh process (a reset process). The refresh process includes a process (a black refresh process) for changing the grayscales of all the pixels 13 to black and a process (a white refresh process) for changing the grayscales of all the pixels 13 to white. In the black refresh process, a voltage which causes voltages of the pixels 13 to be +15 V is applied to all the data lines 12 for seven frames. In the white refresh process, a voltage which causes voltages of the pixels 13 to be −15 V is applied to all the data lines 12 for seven frames. In this example, the white refresh process is performed after the black refresh process. When the refresh process is completed, the controller 2 performs a process for writing a voltage corresponding to the data stored in the binary data storage region 53 in the pixels 13. A voltage which causes voltages of the pixels 13 to be +15 V is applied for seven frames to the data lines 12 corresponding to the pixels 13 which represent a black grayscale by the data stored in the binary data storage region 53.

According to this example, in a case where the writing operation continues, such as a case where selected pages are changed and page advance is frequently performed, the binarization process is performed using the low power consumption type dither matrix. The writing operation according to the flow in FIG. 15 enables high-speed rewriting as compared with the writing operation according to the modified example 1. In addition, since the binarization process is performed in the second operation mode when the writing operation continues, it is possible to perform high-speed writing at low power consumption. After the page advance is completed, rewriting is performed using an image which has undergone the binarization process in the first operation mode, and thus it is possible to display a higher quality image.

In addition, in the modified example 1, the refresh process may be omitted. As another example, an image recreation using an image which has undergone the binarization process in the first operation mode may be performed after threshold value or more time has elapsed from a time point when a previous rewriting instruction is input. In this case, the controller 2 monitors an elapsed time after the previous rewriting instruction is input. If the threshold value or more time has elapsed from the time point when the previous rewriting instruction is input, the controller 2 controls the scanning line driving circuit 15 and the data line driving circuit 16 such that an image recreation using an image which has undergone the binarization process in the first operation mode is performed.

3-3. Modified Example 3

Figures 32A, 32B:
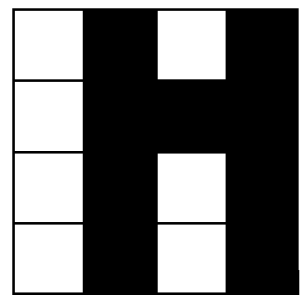
FIGS. 32A to 32F show diagrams exemplifying a low power consumption type dither matrix according to a modified example 3.
Figures 32C, 32D:
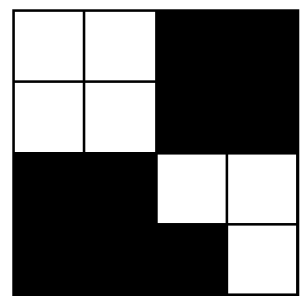
Figures 32E, 32F:
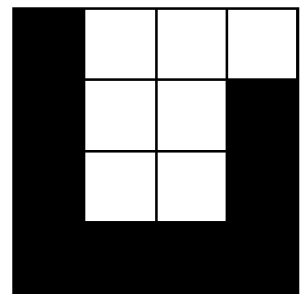

FIGS. 32A to 32F are diagrams exemplifying a low power consumption type dither matrix according to the modified example 3. The dither matrix used in the second operation mode is not limited to that described in the embodiment. In FIG. 9B, a so-called longitudinal dither matrix in which the pixels 13 with the same grayscale tend to be readily continuous in the longitudinal direction (the column direction, the extending direction of the data lines 12) has been exemplified. Instead of the longitudinal dither matrix, a dither matrix shown in FIGS. 32A to 32F may be used. FIGS. 32A, 32C and 32E show a so-called spiral wound dither matrix. FIGS. 32B, 32D and 32F show examples where images in which grayscales of all the pixels 13 are intermediate grayscales are binarized using the dither matrix of FIGS. 32A, 32C and 32E. In the spiral wound dither matrix, a boundary between black and white (in a case of two grayscales) tends to become less than in the Bayer type dither matrix. In the image which is binarized using the spiral wound dither matrix, a boundary between black and white tends to become narrower than in an image which is binarized using the longitudinal dither matrix. For this reason, an afterimage due to blurring (misalignment of intermediate grayscales) and a contour afterimage are decreased. For example, when a moving image is displayed, it is possible to improve visibility as compared with a case of using the longitudinal dither matrix. In addition, the spiral wound dither matrix has a longitudinal direction spatial frequency higher than that of the longitudinal dither matrix but has a longitudinal direction spatial frequency lower than that of the Bayer type dither matrix. Therefore, in terms of power consumption, it is more advantageous than the Bayer type dither matrix. In addition, as another example, dither matrices other than the longitudinal or spiral wound dither matrix may be used in the second operation mode. Any dither matrix may be used as long as it has a longitudinal direction spatial frequency lower than that of the dither matrix used in the first operation mode.

3-4. Modified Example 4

A condition that a moving image is displayed may be used as the first condition, and a condition that a still image is displayed may be used as the second condition. As described in the embodiment, whether images are updated in response to a page advance instruction or images are updated at a specific cycle due to moving image display, the point is that a condition that an image updating frequency is equal to or more than a threshold value may be used as the second condition. At this time, a condition that the image updating frequency is less than the threshold value may be used as the first condition. It can be said that the first condition in the modified example 2 is a condition that image updating is finished at a frequency which is equal to or more than the threshold value.

3-5. Modified Example 5

As the second condition, a condition that a remaining battery capacity is less than a threshold value may be used. In this case, the electronic apparatus 1000 is operated by power supplied from a battery. The controller 2 monitors the remaining battery capacity, and determines whether the binarization process is performed in either the first operation mode or the second operation mode depending on the remaining battery capacity when a rewriting instruction is input. In this example, if the remaining battery capacity is less than the threshold value, the binarization process is performed in the second operation mode. In addition, in this case, a condition that the remaining battery capacity is equal to or more than the threshold value when a rewriting instruction is input is used as the first condition.

3-6. Modified Example 6

A condition that a picture image is displayed may be used as the first condition, and a condition that a character image is displayed may be used as the second condition. Alternatively, in contrast, a condition that a character image is displayed may be used as the first condition, and a condition that a picture image is displayed may be used as the second condition.

3-7. Modified Example 7

The first and second conditions may be determined depending on the typeface (font) used in a displayed image. For example, a condition that a font where characters are thin such as a Mincho typeface is used may be used as the first condition, and a condition that a font where characters are thick such as Gothic typeface is used may be used as the second condition.

3-8. Modified Example 8

The first and second conditions may be determined depending on an operation of the operation unit 9 by a user. For example, high-speed page advance may be performed in the second operation mode while the button 9 is continuously pressed, and a high quality image may be recreated in the first operation mode when the user releases the finger from the button 9 (the pressing of the button 9 is stopped).

3-9. Modified Example 9

The number of conditions to be used is not limited to two. There or more operation modes may be changed according to three or more conditions. For example, the binarization process may be performed according to a first operation mode, a second operation mode, and a third operation mode, which respectively use a first dither matrix, a second dither matrix, and a third dither matrix, in an order that a longitudinal direction spatial frequency is large. In this case, for example, two threshold values th1 and th2 are set depending on a remaining battery capacity (th1>th2). With respect to a remaining battery capacity C when a rewriting instruction is input, the first condition is a condition of C>th1, the second condition is a condition of th1>C>th2, and the third condition is a condition of th2>C.

3-10. Modified Example 10

A configuration of the operation unit 9 is not limited to that described in the embodiment. The operation unit 9 may have a position input device which obtains information for a position where a stylus pen is touched in the display unit 1. The electronic apparatus 1000 acquires a position or a movement trajectory of the stylus pen based on the positional information obtained by the position input device, and may control the respective units of the electronic apparatus 1000 according to the acquired position or movement trajectory.

3-11. Other Modified Examples

The electronic apparatus 1000 is not limited to the electronic book reader. The electronic apparatus 1000 may be a personal computer, a PDA (Personal Digital Assistant), a mobile phone, a smart phone, a tablet terminal, or a portable gaming machine. In the electronic apparatuses, the functions shown in FIG. 6 may be realized by the control unit 3 executing programs. The programs may be provided in a state of being stored on a computer readable recording medium such as a magnetic recording medium (a magnetic tape, a magnetic disk (HDD (Hard Disk Drive), FD (Flexible Disk)), or the like), an optical recording medium (an optical disc (CD (Compact Disc), DVD (Digital Versatile Disc)), or the like), a magneto-optical recording medium, or a semiconductor memory. As another example, the programs may be downloaded to the electronic apparatus 1000 via communication lines. The programs obtained in this way are installed in the electronic apparatus 1000 and are used. In addition, in the embodiment, the control unit 3 may have a portion or all of the functions described as functions of the controller 2. As still another example, a combination of the display unit 1 and the controller 2 may be provided as a display apparatus.

An equivalent circuit of the pixel is not limited to that described in the embodiment. As long as a configuration can apply a controlled voltage between the pixel electrode 104 and the transparent electrode 122, switching elements and capacitive elements may be arbitrarily combined. In addition, a method of driving the pixel is not limited to the bipolar driving described in the embodiment. A single polarity driving where a single polarity voltage is applied to the pixel in a single frame may be performed.

A structure of the pixel is not limited to that described in the embodiment. For example, polarities of charged particles are not limited to those described in the embodiment. Black electrophoretic particles may be charged to a negative polarity, and white electrophoretic particles may be charged to a positive polarity. In this case, polarities of voltages applied to the pixels are reversed to those described in the embodiment. Further, a display element is not limited to the electrophoretic type display element using micro capsules. Other display elements such as a liquid crystal element or an organic EL (Electro Luminescence) element may be used. Although, in the embodiment, the display unit 1 has a monochrome two-grayscale display function, it may have a monochrome three-grayscale or more or color display function. As another example, the display unit 1 may use a passive matrix type.

A portion of the functions of the electronic apparatus 1000 shown in FIG. 6, or a portion of the processes described with reference to the flowchart shown in FIG. 7 or the like may be omitted. In addition, the color quantization process is not limited to the pattern dither method. Processes other than the pattern dither method, such as an error diffusion method, may be used. The point is that processes having a different spatial frequency in the extending direction of the data lines 12 of an image written in the display unit 1 may be changed and used.

An image displayed on the display unit 1 is not limited to the electronic book image. An image displayed on the display unit 1 may be a paper, a report, a material, a diagram, a picture, a website, or the like. In addition, although, in the embodiment, the example where time data is stored in the storage unit 8 so as to correspond to book data has been described, the time data may be stored in a storage device different from a storage device storing the book data.

The entire disclosure of Japanese Patent Application No. 2011-062597, filed Mar. 22, 2011 is expressly incorporated by reference herein.

What is claimed is:

1. A control device comprising:
an output unit configured to output a signal for controlling an electro-optical device having a plurality of pixels which are provided so as to correspond to intersections of a plurality of scanning lines and a plurality of data lines, to the electro-optical device;
a control unit configured to control the output unit to output a signal for applying a voltage corresponding to data stored in a memory to the plurality of data lines, and
a color quantization process unit configured to perform a color quantization process for a grayscale value of each of the plurality of pixels, indicated by data stored in the memory,
wherein
a first image which has a first spatial frequency of grayscale variations in an extending direction of the data lines is written by the signal when a first condition is satisfied, and a second image which has a second spatial frequency of grayscale variations in the extending direction of the data lines is written by the signal when a second condition is satisfied,
the first spatial frequency is higher than the second spatial frequency, and
the color quantization process unit is configured to perform the color quantization process so that the first image which is obtained through the color quantization process when the first condition is satisfied has the first spatial frequency and the second image which is obtained through the color quantization process when the second condition is satisfied has the second spatial frequency.

2. The control device according to claim 1, further comprising a first storage unit configured to store a first dither matrix and a second dither matrix which has a lower spatial frequency of grayscale variations in the extending direction of the data lines than that of the first dither matrix, wherein the color quantization process unit performs the color quantization process using the first dither matrix when the first condition is satisfied and using the second dither matrix when the second condition is satisfied.

3. The control device according to claim 1, wherein the second condition is a condition that an updating frequency of the image is equal to or more than a threshold value.

4. The control device according to claim 3, wherein the first condition is a condition that the updating frequency of the image is less than the threshold value.

5. The control device according to claim 4, wherein the first condition is a condition that updating of the image is finished at a frequency which is equal to or more than the threshold value.

6. The control device according to claim 1, wherein the second condition is a condition that a remaining capacity of a battery which supplies power to the control device is less than a threshold value.

7. The control device according to claim 6, wherein the first condition is a condition that the remaining capacity of the battery is equal to or more than the threshold value.

8. The control device according to claim 1, wherein the second condition is a condition that the image is a character image.

9. The control device according to claim 8, wherein the first condition is a condition that the image is a picture image.

10. A display apparatus comprising:
the control device according to claim 1; and
the electro-optical device.

11. An electronic apparatus comprising the display apparatus according to claim 10.

12. A control device comprising:
an output unit configured to output a signal for controlling an electro-optical device having a plurality of pixels which are provided so as to correspond to intersections of a plurality of scanning lines and a plurality of data lines, to the electro-optical device; and
a control unit configured to control the output unit to output a signal for applying a voltage corresponding to data stored in a memory to the plurality of data lines,
wherein a first image which has a first spatial frequency of grayscale variations in an extending direction of the data lines is written by the signal when a first condition is satisfied, and a second image which has a second spatial frequency of grayscale variations in the extending direction of the data lines is written by the signal when a second condition is satisfied, the first spatial frequency being higher than the second spatial frequency,
wherein grayscales of the plurality of pixels are changed by a writing operation where a voltage is applied to a corresponding pixel multiple times,
wherein the control unit determines a pixel of which a grayscale is to be changed of the plurality of pixels, using a comparison result between image data read from a second storage unit configured to store the image data indicating an image which is newly displayed on the electro-optical device, and scheduled image data read from a third storage unit configured to store the scheduled image data indicating an image which is scheduled to be displayed on the electro-optical device by the writing operation in progress,
wherein the control unit controls the output unit to output the signal for starting the writing operation for a corresponding pixel so as to have a grayscale set by the image data if the pixel determined as a pixel of which a grayscale is to be changed is not in the writing operation, and controls the output unit to output the signal for starting the writing operation for a corresponding pixel so as to have a grayscale set by the image data after the writing operation in progress is finished if the pixel determined as the pixel of which a grayscale is to be changed is in the writing operation, and wherein the second condition is a condition that there is a pixel where the writing operation is in progress.

13. The control device according to claim 12, wherein the first condition is a condition that there is no pixel where the writing operation is in progress.

14. The control device according to claim 13, wherein, when the first condition is satisfied, the control unit rewrites an image which has been written according to the second condition, according to the first condition.

15. A control device comprising:

an output unit configured to output a signal for controlling an electro-optical device having a plurality of pixels which are provided so as to correspond to intersections of a plurality of scanning lines and a plurality of data lines, to the electro-optical device; and a control unit configured to control the output unit to output a signal for applying a voltage corresponding to data stored in a memory to the plurality of data lines, an image processing unit which processes an original image to a first image at a first operation mode and to a second image at a second operation mode, a number of gray level of the second image is same as a number of gray level of the first image, wherein a frequency of electrical change of the data line when rewriting the second image is less than a frequency of electrical change of the data line when rewriting in the first image.

16. A control device comprising:

an output unit configured to output a signal for controlling an electro-optical device having a plurality of pixels which are provided so as to correspond to intersections of a plurality of scanning lines and a plurality of data lines, to the electro-optical device; and a control unit configured to control the output unit to output a signal for applying a voltage corresponding to data stored in a memory to the plurality of data lines, an image processing unit which processes an original image to a first image at a first operation mode and to a second image at a second operation mode, a number of gray level of the second image is same as a number of gray level of the first image, wherein a frequency of grayscale variation corresponding to pixel data of a first gray level and pixel data of a second gray level in the first image in an extending direction of the plurality of data lines is larger than frequency of grayscale variation corresponding to pixel data of the first gray level and pixel data of the second gray scale level in the second image in an extending direction of the plurality of data lines.

* * * * *